(12) United States Patent
Karczewicz et al.

(10) Patent No.: US 10,362,336 B2
(45) Date of Patent: Jul. 23, 2019

(54) PALETTE PREDICTOR SIGNALING WITH RUN LENGTH CODE FOR VIDEO CODING

(71) Applicant: QUALCOMM Incorporated, San Diego, CA (US)

(72) Inventors: Marta Karczewicz, San Diego, CA (US); Wei Pu, San Diego, CA (US); Vadim Seregin, San Diego, CA (US); Rajan Laxman Joshi, San Diego, CA (US); Joel Sole Rojals, La Jolla, CA (US); Feng Zou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 399 days.

(21) Appl. No.: 14/667,411

(22) Filed: Mar. 24, 2015

(65) Prior Publication Data

US 2015/0281728 A1    Oct. 1, 2015

Related U.S. Application Data

(60) Provisional application No. 61/970,257, filed on Mar. 25, 2014, provisional application No. 61/981,105, (Continued)

(51) Int. Cl.
H04N 19/52        (2014.01)
H04N 19/93        (2014.01)
(Continued)

(52) U.S. Cl.
CPC ............. *H04N 19/93* (2014.11); *H04N 19/27* (2014.11); *H04N 19/593* (2014.11); *H04N 19/176* (2014.11)

(58) Field of Classification Search
CPC ...................................................... H04N 19/93
See application file for complete search history.

(56) References Cited

U.S. PATENT DOCUMENTS 8,428,133 B2    4/2013    Ye et al.
8,634,456 B2    1/2014    Chen et al.
(Continued)

FOREIGN PATENT DOCUMENTS

JP    2011130413        6/2011
WO    2007112417 A2    10/2007
(Continued)

OTHER PUBLICATIONS

Chen et al. ("Description of screen content coding technology proposal by Qualcomm", Joint Collaborative Team on Video Coding (JCT-VC) of ITU-T SG16 WP3 and ISO/IEC JTC1/SC29/WG11, 17th Meeting: Valencia, ES, Mar. 27-Apr. 4, 2014, Document: JCTVC-Q0031).*

(Continued)

*Primary Examiner* — Dave Czekaj
*Assistant Examiner* — Berteau Joisil
(74) *Attorney, Agent, or Firm* — Shumaker & Sieffert, P.A.

(57) ABSTRACT

Techniques for encoding a binary prediction vector for predicting a palette for palette-based video coding is described. In one example, a method of decoding video comprises receiving an encoded binary prediction vector for a current block of video data, decoding the encoded binary prediction vector using a run-length decoding technique, generating a palette for the current block of video data based on the binary prediction vector, the binary prediction vector comprising entries indicating whether or not previously-used palette entries are reused for the palette for the current block of video data, and decoding the current block of video data using the palette.

48 Claims, 10 Drawing Sheets

Related U.S. Application Data filed on Apr. 17, 2014, provisional application No. 62/002,668, filed on May 23, 2014, provisional application No. 62/015,327, filed on Jun. 20, 2014, provisional application No. 62/018,461, filed on Jun. 27, 2014, provisional application No. 62/041,119, filed on Aug. 24, 2014.

(51) Int. Cl.
| | | |
|---|---|---|
| H04N 19/593 | (2014.01) | |
| H04N 19/27 | (2014.01) | |
| H04N 19/176 | (2014.01) | |

(56) References Cited

U.S. PATENT DOCUMENTS

| | | | |
|---|---|---|---|
| 8,848,789 B2 | 9/2014 | Bao | |
| 8,879,632 B2 | 11/2014 | Joshi et al. | |
| 2002/0159632 A1 | 10/2002 | Chui et al. | |
| 2012/0057799 A1* | 3/2012 | Nguyen | H03M 7/3082 382/232 |
| 2014/0301475 A1 | 10/2014 | Guo et al. | |
| 2015/0016501 A1 | 1/2015 | Guo et al. | |
| 2015/0264348 A1 | 9/2015 | Zou et al. | |
| 2015/0264363 A1 | 9/2015 | Pu et al. | |
| 2016/0337649 A1* | 11/2016 | Chuang | H04N 19/159 |

FOREIGN PATENT DOCUMENTS

| | | |
|---|---|---|
| WO | 2008157269 A2 | 12/2008 |
| WO | 2010039733 A2 | 4/2010 |
| WO | 2011130186 A2 | 10/2011 |

OTHER PUBLICATIONS

Wiegand et al., "WD1: Working Draft 1 of High-Efficiency Video Coding," JCTVC-C403, 3rd Meeting: Guangzhou, CN, Oct. 7-15, 2010 (Joint Collaborative Team on Video Coding of ISO/IEC JTC1/SC29/WG11 and ITU-T SG.16); Jan. 6, 2011, 137 pp.

Wiegand et al., "WD2: Working Draft 2 of High-Efficiency Video Coding," JCTVC-D503, 4th Meeting: Daegu, KR, Jan. 20-28, 2011 (Joint Collaborative Team on Video Coding of ISO/IEC JTC1/SC29/WG11 and ITU-T SG.16); Apr. 15, 2011, 153 pp.

Wiegand et al., "WD3: Working Draft 3 of High-Efficiency Video Coding," Document JCTVC-E603, 5th Meeting: Geneva, CH, Mar. 16-23, 2011 (Joint Collaborative Team on Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14-22, 2011 (Joint Collaborative Team on Video Coding of ISO/IEC JTC1/SC29/WG11 and ITU-T SG.16); JCTVC-F803_d2, Oct. 4, 2011, 226 pp.

Bross et al., "WD5: Working Draft 5 of High-Efficiency Video Coding," 7th Meeting: Geneva, CH, Nov. 21-30, 2011 (Joint Collaborative Team on Video Coding of ISO/IEC JTC1/SC29/WG11 and ITU-T SG.16); JCTVC-G1103_d2, Dec. 30, 2011, 214 pp.

Bross et al., "High efficiency video coding (HEVC) text specification draft 6," 8th Meeting: San Jose, CA, USA, Feb. 1-10, 2012 (Joint Collaborative Team on Video Coding of ISO/IEC JTC1/SC29/WG11 and ITU-T SG.16); JCTVC-H1003, Apr. 2, 2012, 259 pp.

Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11-20, 2012 (Joint Collaborative Team on Video Coding of ISO/IEC JTC1/SC29/WG11 and ITU-T SG.16); JCTVC-J1003_d7, Jul. 28, 2012, 261 pp.

Bross et al., "High Efficiency Video Coding (HEVC) text specification draft 9," 11th Meeting: Shanghai, CN, Oct. 10-19, 2012 (Joint Collaborative Team on Video Coding of ISO/IEC JTC1/SC29/WG11 and ITU-T SG.16); JCTVC-K1003_v7, Nov. 2, 2012, 290 pp.

Bross et al., "High Efficiency Video Coding (HEVC) text specification draft 10 (for FDIS & Last Call)," 12th Meeting: Geneva, CH, Jan. 14-23, 2013 (Joint Collaborative Team on Video Coding of ISO/IEC JTC1/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Chen et al., "Description of screen content coding technology proposal by Qualcomn," JCT-VC Meeting; Valencia, ES (Joint Collaborative Team on Video Coding of ISO/IEC JTC1/SC29/WG11 and ITU-T SG.16), No. JCTVC-Q0031, Mar. 18, 2014, XP030115915, 18 pp.

Golomb, "Run-Length Encodings," IEEE Transactions on Information Theory, IEEE Press, Jul. 1966, vol. 12, No. 3, pp. 399-401, XP000867152, ISSN: 0018-9448, DOI: 10.1109/TIT.1966.1053907.

Guo et al., "RCE4: Test 1. Major-color-based screen content coding," JCT-VC Meeting; Jan. 9-17, 2014, San Jose, CA, US (Joint Collaborative Team on Video Coding of ISO/IEC JTC1/SC29/WG11 and ITU-T SG.16); No. JCTVC-P0108, Jan. 3, 2014; 12 pp.

Guo et al. "RCE4: Results of Test 2 on Palette Mode for Screen Content Coding," JCT-VC Meeting; Jan. 9-17, 2014, San Jose, CA, US (Joint Collaborative Team on Video Coding of ISO/IEC JTC1/SC29/WG11 and ITU-T SG.16); No. JCTVC-P0198, Jan. 8, 2014; 3 pp.

Gisquet et al., "AhG10: palette predictor stuffing," JCT-VC Meeting; Mar. 27-Apr. 4, 2014, Valencia, ES (Joint Collaborative Team on Video Coding of ISO/IEC JTC1/SC29/WG11 and ITU-T SG.16); No. JCTVC-Q0063, version 3; Mar. 29, 2014, 3 pp.

Pu et al., "AHG10: Suggested Software for Palette Coding based on RExt6.0," JCT-VC Meeting; Mar. 27-Apr. 4, 2014, Valencia, ES (Joint Collaborative Team on Video Coding of ISO/IEC JTC1/SC29/WG11 and ITU-T SG.16); No. JCTVC-Q0094, Mar. 19, 2014; 4 pp.

Guo et al., "RCE4: Summary report of HEVC Range Extensions Core Experiments 4 (RCE4) on palette coding for screen content," JCT-VC Meeting; Jan. 9-17, 2014; San Jose, CA, US (Joint Collaborative Team on Video Coding of ISO/IEC JTC1/SC29/WG11 and ITU-T SG.16); No. JCTVC-P0035, Jan. 9, 2014; 8 pp.

Norkin et al., "HEVC Deblocking Filter," IEEE Trans. Cirt. & Sys. Video Technol., vol. 22, No. 12, Dec. 2012, 9 pp.

Flynn et al., "High Efficiency Video Coding (HEVC) Range Extensions text specification: Draft 7," JCT-VC Meeting; Mar. 27-Apr. 4, 2014, Valencia, ES (Joint Collaborative Team on Video Coding of ISO/IEC JTC1/SC29/WG11 and ITU-T SG.16); No. JCTVC-Q1005_v9, Jun. 19, 2014; 363 pp.

Huang et al., "Description of Screen Content Core Experiment 3 (SCCE3): Palette mode," JCT-VC Meeting; Mar. 27-Apr. 4, 2014, Valencia, ES (Joint Collaborative Team on Video Coding of ISO/IEC JTC1/SC29/WG11 and ITU-T SG.16); No. JCTVC-Q1123, Apr. 18, 2014, 11 pp.

Gisquet et al., "AhG10: palette index coding," JCT-VC Meeting; Mar. 27-Apr. 4, 2014, Valencia, ES (Joint Collaborative Team on Video Coding of ISO/IEC JTC1/SC29/WG11 and ITU-T SG.16); No. JCTVC-Q0064, Mar. 29, 2014; 3 pp.

Laroche et al. "AhG10: run coding for palette mode," JCT-VC Meeting; Mar. 27-Apr. 4, 2014, Valencia, ES (Joint Collaborative

(56) References Cited

OTHER PUBLICATIONS

Team on Video Coding of ISO/IEC JTC1/SC29/WG11 and ITU-T SG.16); No. JCTVC-Q0066, Mar. 17, 2014; 2 pp.
International Search Report and Written Opinion from International Application No. PCT/US2015/022468, dated May 19, 2015, 13 pp.
Second Written Opinion from International Application No. PCT/US2015/022468, dated Mar. 18, 2016, 7 pp.
International Preliminary Report on Patentability of International Application No. PCT/US2015/022468 dated Jun. 20, 2016, 24 pp.
Okubo E., "Revised Third Edition H264/AVC Textbook", 1st Edition, Jan. 1, 2009, Impress R&D, pp. 148-162, ISBN: 978-4-8443-2664-9.

\* cited by examiner

PREDICTION PALETTE BUFFER
210

| ENTRY INDEX | PIXEL VALUE |
|---|---|
| 1 | VALUE A |
| 2 | VALUE B |
| 3 | VALUE C |
| 4 | VALUE D |
| 5 | VALUE E |
| 6 | VALUE F |
| 7 | VALUE G |
| 8 | VALUE H |
| 9 | VALUE I |
| 10 | VALUE J |
| 11 | VALUE K |
| 12 | VALUE L |
| 13 | VALUE M |
| ... | ... |

CURRENT PALETTE
220

| ENTRY INDEX | PIXEL VALUE |
|---|---|
| 1 | VALUE A |
| 2 | VALUE B |
| 3 | VALUE E |
| 4 | VALUE I |
| 5 | NEW VALUE |
| 6 | NEW VALUE |
| 7 | NEW VALUE |
| 8 | NEW VALUE | b = [1100100010000]

FIG. 5

PALETTE PREDICTOR SIGNALING WITH RUN LENGTH CODE FOR VIDEO CODING

This application claims the benefit of U.S. Provisional Application No. 61/970,257, filed Mar. 25, 2014, U.S. Provisional Application No. 61/981,105, filed Apr. 17, 2014, U.S. Provisional Application No. 62/002,668 filed May 23, 2014, U.S. Provisional Application No. 62/015,327, filed Jun. 20, 2014, U.S. Provisional Application No. 62/018,461, filed Jun. 27, 2014, and U.S. Provisional Application No. 62/041,119, filed Aug. 24, 2014, the entire contents of each of which are incorporated by reference herein.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

SUMMARY

This disclosure relates to video encoding and decoding techniques. In particular, this disclosure describes techniques for encoding and decoding video data with a palette-based coding mode. In a palette-based coding mode, pixel values for a block of video data may be coded relative to a palette of color values associated with the block of video data. The palette of color values may be determined by a video encoder and may contain the color values that are most common for a particular block. The video encoder may assign an index into the palette of color values to each pixel in the block of video data, and signal such an index to a video decoder. The video decoder may then use the index into the palette to determine what color value to use for a particular pixel in the block.

In addition to signaling indices in the palette, a video encoder may also transmit the palette itself in the encoded video bitstream. Techniques for transmitting the palette may include explicitly signaling the palette values, as well as predicting the palette entries for a current block from palette entries from one or more previously coded blocks. This disclosure describes techniques for signaling one or more syntax elements (e.g., a binary prediction vector) that indicate which palette entries from previously coded blocks of video data may be reused for a current block of video data. This disclosure further describes techniques for encoding and decoding the binary prediction vector.

In one example of the disclosure, a method of decoding video data comprises receiving an encoded binary prediction vector for a current block of video data, decoding the encoded binary prediction vector using a run-length decoding technique, generating a palette for the current block of video data based on the binary prediction vector, the binary prediction vector comprising entries indicating whether or not previously-used palette entries are reused for the palette for the current block of video data, and decoding the current block of video data using the palette.

In another example of the disclosure, a method of encoding video data comprises generating a palette for the current block of video data, generating a binary prediction vector for the palette for the current block of video data, the binary prediction vector comprising entries indicating whether or not previously-used palette entries are reused for the palette for the current block of video data, encoding the binary prediction vector using a run-length encoding technique, and encoding the current block of video data using the palette.

In another example of the disclosure, an apparatus configured to decode video data comprises a memory configured to store the video data, and a video decoder in communication with the memory configured to receive an encoded binary prediction vector for a current block of the video data, decode the encoded binary prediction vector using a run-length decoding technique, generate a palette for the current block of video data based on the binary prediction vector, the binary prediction vector comprising entries indicating whether or not previously-used palette entries are reused for the palette for the current block of video data, and decode the current block of video data using the palette.

In another example of the disclosure, an apparatus configured to encode video data comprises a memory configured to store the video data a video encoder in communication with the memory configured to generate a palette for a current block of the video data, generate a binary prediction vector for the palette for the current block of video data, the binary prediction vector comprising entries indicating whether or not previously-used palette entries are reused for the palette for the current block of video data, encode the binary prediction vector using a run-length encoding technique, and encode the current block of video data using the palette.

In another example of the disclosure, an apparatus configured to decode video data comprises means for receiving an encoded binary prediction vector for a current block of video data, means for decoding the encoded binary prediction vector using a run-length decoding technique, means for generating a palette for the current block of video data based on the binary prediction vector, the binary prediction vector comprising entries indicating whether or not previously-used palette entries are reused for the palette for the current block of video data, and means for decoding the current block of video data using the palette.

In another example of the disclosure, an apparatus configured to encode video data comprises means for generating a palette for the current block of video data, means for generating a binary prediction vector for the palette for the current block of video data, the binary prediction vector comprising entries indicating whether or not previously-used palette entries are reused for the palette for the current block of video data, means for encoding the binary prediction vector using a run-length encoding technique, and means for encoding the current block of video data using the palette.

In another example, this disclosure describes a computer-readable storage medium storing instructions that, when executed, cause one or more processors of a device configured to decode video data to receive an encoded binary prediction vector for a current block of the video data, decode the encoded binary prediction vector using a run-length decoding technique, generate a palette for the current block of video data based on the binary prediction vector, the binary prediction vector comprising entries indicating whether or not previously-used palette entries are reused for the palette for the current block of video data, and decode the current block of video data using the palette.

In another example, this disclosure describes a computer-readable storage medium storing instructions that, when executed, cause one or more processors of a device configured to encode video data to generate a palette for a current block of the video data, generate a binary prediction vector for the palette for the current block of video data, the binary prediction vector comprising entries indicating whether or not previously-used palette entries are reused for the palette for the current block of video data, encode the binary prediction vector using a run-length encoding technique, and encode the current block of video data using the palette.

The details of one or more examples are set forth in the accompanying drawings and the description below. Other features, objects, and advantages will be apparent from the description and drawings, and from the claims.

BRIEF DESCRIPTION OF DRAWINGS

FIG. 5 is a conceptual diagram illustrating an example palette prediction technique according to the techniques of the disclosure.

DETAILED DESCRIPTION

Figure 1:
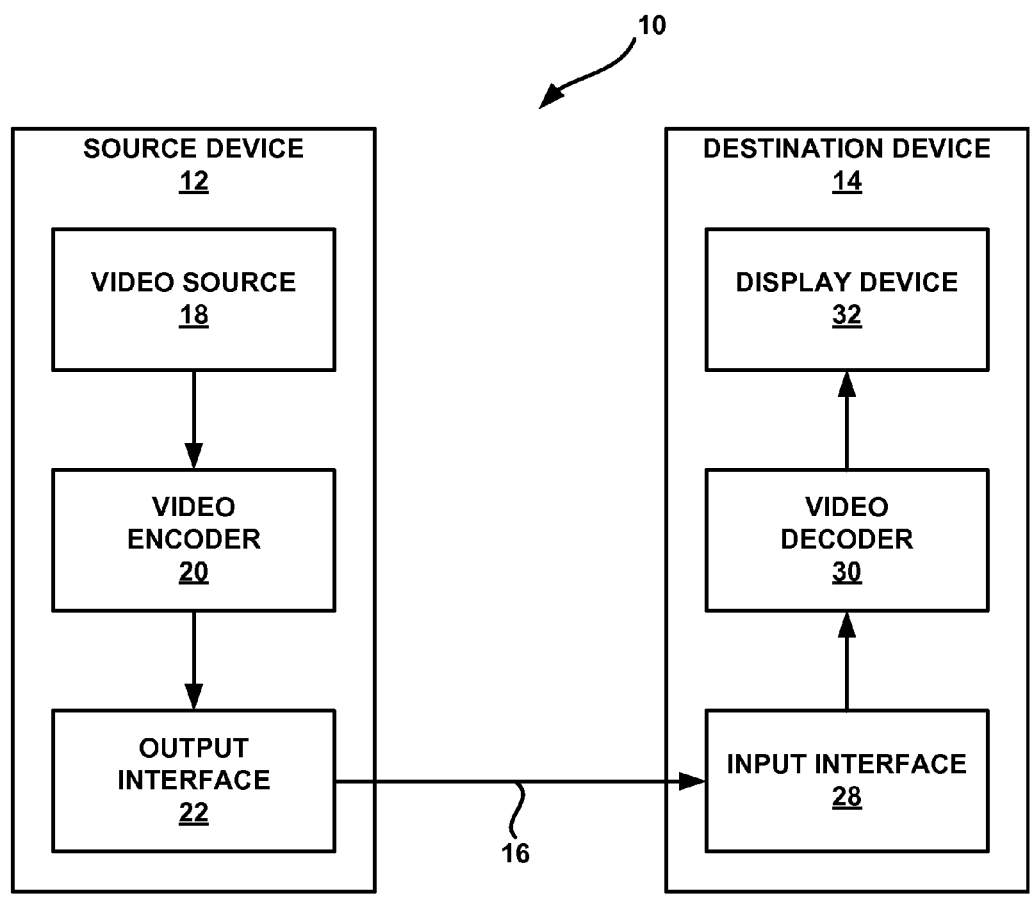
FIG. 1 is a block diagram illustrating an example video coding system that may implement the techniques described in this disclosure.

This disclosure includes techniques for video coding and compression. In particular, this disclosure describes techniques for palette-based coding of video data. In traditional video coding, images are assumed to be continuous-tone and spatially smooth. Based on these assumptions, various tools have been developed such as block-based transform, filtering, etc., and such tools have shown good performance for natural content videos.

However, in applications like remote desktop, collaborative work and wireless display, computer generated screen content (e.g., such as text or computer graphics) may be the dominant content to be compressed. This type of content tends to have discrete-tone and feature sharp lines, and high contrast object boundaries. The assumption of continuous-tone and smoothness may no longer apply for screen content, and thus traditional video coding techniques may not be efficient ways to compress video data including screen content.

Palette-based coding techniques may be particularly suitable for screen generated content coding. For example, assuming a particular area of video data has a relatively small number of colors. A video coder (e.g., a video encoder or video decoder) may form a so-called "palette" as a table of colors for representing the video data of the particular area (e.g., a given block). Each pixel may be associated with an entry in the palette that represents the color of the pixel. For example, the video coder may code an index that relates the pixel value to the appropriate value in the palette.

The techniques for palette-based coding of video data may be used with one or more other coding techniques, such as techniques for inter- or intra-predictive coding. For example, as described in greater detail below, an encoder or decoder, or combined encoder-decoder (codec), may be configured to perform inter- and intra-predictive coding, as well as palette-based coding.

In some examples, the palette-based coding techniques may be configured for use with one or more video coding standards. Some example video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In another example, the palette-based coding techniques may be configured for use with the High Efficiency Video Coding (HEVC). HEVC is a new video coding standard developed by the Joint Collaboration Team on Video Coding (JCT-VC) of ITU-T Video Coding Experts Group (VCEG) and ISO/IEC Motion Picture Experts Group (MPEG).

Recently, the design of HEVC has been finalized by the Joint Collaboration Team on Video Coding (JCT-VC) of ITU-T Video Coding Experts Group (VCEG) and ISO/IEC Motion Picture Experts Group (MPEG). The latest HEVC specification, referred to as HEVC Version 1 hereinafter, is described in "ITU-T H.265 (V1)," which as of Mar. 24, 2015 is available from http://www.itu.int/ITU-T/recommendations/rec.aspx?rec=11885&lang=en. Document ITU-T H.265, SERIES H: AUDIOVISUAL AND MULTIMEDIA SYSTEMS, Infrastructure of Audiovisual Services—Coding of Moving Video, "High Efficiency Video Coding," April 2013 also describes the HEVC standard. A recent specification of Range extensions, referred to as RExt hereinafter, is described in "ITU-T H.265 (V2)," which as of Mar. 24, 2015 is available from http://www.itu.int/ITU-T/recommendations/rec.aspx?rec=12296&lang=en.

When using example palette-based coding techniques, a video encoder may encode a block of video data by determining a palette for the block (e.g., coding the palette explicitly, predicting it, or a combination thereof), locating an entry in the palette to represent the value of each pixel, and encoding the block with index values for the pixels relating the pixel value to the palette. A video decoder may obtain, from an encoded bitstream, a palette for a block, as well as index values for the pixels of the block. The video decoder may relate the index values of the pixels to entries of the palette to reconstruct the pixel values of the block. The example above is intended to provide a general description of palette-based coding.

In addition to signaling index values into the palette, a video encoder may also transmit the palette itself in the encoded video bitstream. Techniques for transmitting the palette may include explicitly signaling the palette values, as well as predicting the palette entries for a current block from palette entries from one or more previously coded blocks. Palette prediction techniques may include signaling a string of syntax elements (e.g., a binary prediction vector) where the value of each syntax element in the binary prediction vector indicates whether or not a palette entry from a previously coded block of video data may be reused for a current block of video data. Such binary prediction vectors may be long for large palette sizes and/or for cases when a large number of palette entries are stored for possible use in the palette prediction process. Large binary prediction vectors may result in unacceptable bit rate levels. In view of these drawbacks, this disclosure describes techniques for encoding and decoding binary prediction vectors in a palette prediction process.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to either video encoding or video decoding. Video encoder 20 and video decoder 30 of video coding system 10 represent examples of devices that may be configured to perform techniques for palette-based video coding in accordance with various examples described in this disclosure. For example, video encoder 20 and video decoder 30 may be configured to selectively code various blocks of video data, such as CUs or PUs as in the High Efficiency Video coding (HEVC) standard, using either palette-based coding or non-palette based coding. Non-palette based coding modes may refer to various inter-predictive, temporal coding modes or intra-predictive, spatial coding modes, such as the various coding modes specified by HEVC Version 1.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses. Various implementations of source device 12, destination device 14, or both, may include one or more processors and memory coupled to the one or more processors. The memory may include, but is not limited to RAM, ROM, EEPROM, flash memory, or any other medium that can be used to store desired program code in the form of instructions or data structures and that can be accessed by a computer, as described herein.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14.

Example file servers include web servers (e.g., for a website), file transfer protocol (FTP) servers, network attached storage (NAS) devices, HTTP streaming servers, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure for a palette-based coding mode in video coding are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

Video coding system 10 illustrated in FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as HEVC standard mentioned above, and described in HEVC Version 1. In addition to the base HEVC standard, there are ongoing efforts to produce scalable video coding, multiview video coding, and 3D coding extensions for HEVC. In addition, palette-based coding modes, e.g., as described in this disclosure, may be provided for extension of the HEVC standard. In some examples, the techniques described in this disclosure for palette-based coding may be applied to encoders and decoders configured to operate according to other video coding standards or future standards. Accordingly, application of a palette-based coding mode for coding of coding units (CUs) or prediction units (PUs) in an HEVC codec is described for purposes of example.

In various examples, the techniques described in this disclosure may include techniques for various combinations of determining, predicting, and/or signaling palettes in palette-based coding. As described in greater detail below, the techniques may include any combination of determining palette predictors, generating a binary prediction vector, and encoding/decoding the binary prediction vector. While certain examples may be individually described for purposes of illustration and clarity, this disclosure contemplates any combination of the techniques for palette-based coding described herein.

As will be explained in more detail below with reference to FIGS. 4-9, video encoder 20 may be configured to generate a palette for a current block of the video data, generate a binary prediction vector for the palette for the current block of video data, the binary prediction vector comprising entries indicating whether or not previously-used palette entries (i.e., entries in palettes for previously-coded blocks) are reused for the palette for the current block of video data, encode the binary prediction vector using a run-length encoding technique, and encode the current block of video data using the palette. Likewise, video decoder 30 may be configured to receive an encoded binary prediction vector for a current block of the video data, decode the encoded binary prediction vector using a run-length decoding technique, generate a palette for the current block of video data based on the binary prediction vector, the binary prediction vector comprising entries indicating whether or not previously-used palette entries are reused for the palette for the current block of video data, and decode the current block of video data using the palette.

In HEVC and other video coding standards, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in the raster scan.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector (MV). When video encoder 20 uses bi-prediction to generate the predictive blocks for a PU, the PU may have two MVs.

After video encoder 20 generates one or more predictive blocks (e.g., predictive luma, Cb and Cr blocks) for one or more PUs of a CU, video encoder 20 may generate a residual block for the CU. Each sample in the residual block may indicate a difference between a sample in one of the CU's predictive blocks and a corresponding sample in a coding block of the CU. For example, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the residual blocks (e.g., luma, Cb and Cr residual blocks) of a CU into one or more transform blocks (e.g., luma, Cb and Cr transform blocks). A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a transform block of a TU to generate a coefficient block for the TU. A coefficient block may be a two-dimensional array of transform coefficients. A transform coefficient may be a scalar quantity. For example, video encoder 20 may apply one or more transforms to a luma transform block of a TU to generate a luma coefficient block for the TU. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encoding syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

To apply CABAC encoding to a syntax element, the video encoder may binarize the syntax element to form a series of one or more bits, which are referred to as "bins." In addition, the video encoder may identify a coding context. The coding context may identify probabilities of coding bins having particular values. For instance, a coding context may indicate a 0.7 probability of coding a 0-valued bin and a 0.3 probability of coding a 1-valued bin. After identifying the coding context, the video encoder 20 may divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If a bin of the syntax element has the value associated with the lower sub-interval, the encoded value may be equal to the lower boundary of the lower sub-interval. If the same bin of the syntax element has the value associated with the upper sub-interval, the encoded value may be equal to the lower boundary of the upper sub-interval. To encode the next bin of the syntax element, the video encoder may repeat these steps with the interval being the sub-interval associated with the value of the encoded bit. When the video encoder 20 repeats these steps for the next bin, the video encoder may use modified probabilities based on the probabilities indicated by the identified coding context and the actual values of bins encoded.

When a video decoder 30 performs CABAC decoding on a syntax element, the video decoder may identify a coding context. The video decoder may then divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If the encoded value is within the lower sub-interval, the video decoder may decode a bin having the value associated with the lower sub-interval. If the encoded value is within the upper sub-interval, the video decoder may decode a bin having the value associated with the upper sub-interval. To decode a next bin of the syntax element, the video decoder may repeat these steps with the interval being the sub-interval that contains the encoded value. When the video decoder repeats these steps for the next bin, the video decoder may use modified probabilities based on the probabilities indicated by the identified coding context and the decoded bins. The video decoder may then de-binarize the bins to recover the syntax element.

Rather than performing regular CABAC encoding on all syntax elements, the video encoder may encode some syntax elements (e.g., bins) using bypass CABAC coding. It may be computationally less expensive to perform bypass CABAC coding on a bin than to perform regular CABAC coding on the bin. Furthermore, performing bypass CABAC coding may allow for a higher degree of parallelization and throughput. Bins encoded using bypass CABAC coding may be referred to as "bypass bins." Grouping bypass bins together may increase the throughput of the video encoder and video decoder. The bypass CABAC coding engine may be able to code several bins in a single cycle, whereas the regular CABAC coding engine may be able to code only a single bin in a cycle. The bypass CABAC coding engine may be simpler because the bypass CABAC coding engine does not select contexts and may assume a probability of ½ for both symbols (0 and 1). Consequently, in bypass CABAC coding, the intervals are split directly in half.

Video encoder 20 may output a bitstream that includes the entropy-encoded syntax elements. The bitstream may include a sequence of bits that forms a representation of coded pictures and associated data. In other words, the bitstream may comprise a coded representation of video data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for SEI, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use MVs of PUs to determine predictive blocks for the PUs of a current CU. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

As described above, the techniques described herein may be applied to palette-based coding of video data. Palette-based coding may generally include one or more of the following techniques. With palette-based video coding, a video coder (e.g., video encoder 20 and/or video decoder 30) may form a so-called "palette" as a table of colors for representing the video data of the particular area (e.g., a given block). Each pixel may be associated with an entry in the palette that represents the color of the pixel. For example, video encoder 20 and/or video decoder 30 may code an index that relates the pixel value to the appropriate value in the palette.

With respect to the HEVC framework, as an example, the palette-based coding techniques may be configured to be used as a coding unit (CU) mode. In other examples, the palette-based coding techniques may be configured to be used as a PU mode in the framework of HEVC. Accordingly, all of the following disclosed processes described in the context of a CU mode may, additionally or alternatively, apply to PUs. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

The document X. Guo and A. Saxena, "RCE4: Summary report of HEVC Range Extension Core Experiments 4 (RCE4) on palette coding for screen content," JCTVC-P0035, San Jose, US, 9-17 Jan. 2014 describes two test results of palette-based modes, which were reported to achieve significant Bjontegaard Distortion-rate (BD-rate) reduction, especially for screen contents. The two methods are briefly summarized below.

In one example method, as described, for example, in the document X. Guo. Y. Lu, and S. Li, "RCE4: Test 1. Major-color-based screen content coding," JCTVC-P0108, San Jose, US, 9-17 Jan. 2014, a histogram-based algorithm is used to classify the pixels. In particular, the most significant N peak values in a histogram are selected as major colors for coding. The pixel values that are close to a major color will be quantized to the major color. Other pixels that do not belong to any major color sets are escape pixels, which are also quantized before coding. For lossless coding, no quantization is used.

By using classification, pixels of a coding unit (CU) can be converted into colour indices. After that, the major colour number and values are coded. Then, the colour indices are coded as follows:

For each pixel line, a flag is signalled to indicate the coding mode. There are three modes: horizontal mode, vertical mode and normal mode.

If the mode is horizontal mode, the whole line shares the same colour index. In this case, the colour index is transmitted.

If the mode is vertical mode, the whole line is the same with the above line. In this case, nothing is transmitted. The current line copies the colour indices of the above line.

If the mode is normal mode, a flag is signalled for each pixel position to indicate whether it is the same with one of the left and above pixels. If not, the index itself is transmitted.

In addition, if the pixel is escape pixel, the pixel value is transmitted.

In another example method, as described, for example, in the document L. Guo, W. Pu, M. Karczewicz, J. Sole, R. Joshi, and F. Zou, "RCE4: Results of Test 2 on Palette Mode for Screen Content Coding," JCTVC-P0198, San Jose, US, 9-17 Jan. 2014, a palette-based coding mode is included as a CU mode. The encoding process of the second method may include the following:

Transmission of the palette: an entry-wise prediction scheme is used to encode the current palette based on the palette of the left CU (the CU neighboring the CU currently being coded to the left). After that, non-predicted entries of the palette are transmitted.

Transmission of pixel values: the pixels in the CU are encoded in a raster scan order using the following three modes:

"Run mode": A palette index is first signaled, followed by "palette run" (M). The following M palette indexes are the same as the signaled palette index first signaled.

"Copy above mode": A value "copy_run" (N) is transmitted to indicate that for the following N palette indexes are the same as their above neighbors, respectively.

"Pixel mode": A prediction flag is first transmitted. The flag value being equal to 1 indicates prediction residual using reconstructed top neighboring pixel as a predictor is transmitted. If the value of this flag is 0, the pixel value is transmitted without prediction.

The palette may make up a relatively significant portion of the bits for a palette coded block (e.g., CU). Accordingly, the video coder may predict one or more entries of the palette based on one or more entries of a previously coded palette (e.g., as noted above with respect to the "transmission of the palette").

In some examples, the video coder may generate a palette predictor list when predicting palette entries. For example, the document C. Gisquet, G. Laroche, and P. Onno, "AhG10: Palette predictor stuffing," JCTVC-Q0063 discloses one example process for determining palette predictors. In some examples, the video coder may use a Boolean vector to indicate whether each item in a palette predictor list is used (or not used) for predicting one or more entries in the palette for the block currently being coded.

In some examples, all of the items in the palette predictor list are derived from the previously coded palette (e.g., the palette coded with the previously coded block). However, such palettes may be spatially far away from the current CU, which may make the palette correlation relatively weak. In general, expanding the palette predictor table may be helpful (e.g., may provide more accurate predictors, which may result in an efficiency gain). However, determining and using a relatively large palette predictor table results in a relatively longer Boolean vector.

In one example of palette coding, video encoder 20 may generate a syntax element, such as a flag "PLT_Mode_flag," that indicates whether or not a palette-based coding mode is used for a particular region of a video frame. For example, the PLT_Mode_flag may be generated at the slice level, the CU-level, the PU-level, or any other level of a video frame. For example, video encoder 20 may generate the PLT_Mode_flag at the CU level and signal the PLT_Mode_flag in an encoded video bitstream. Video decoder 30 may then parse the PLT_Mode_flag upon decoding the encoded video bitstream. In this example, a value of this PLT_Mode_flag equal to 1 specifies that the current CU is encoded using a palette mode. In this case, video decoder 30 may apply the palette-based coding mode to decode the CU. In some examples, a syntax element may indicate one of a plurality of different palette modes for the CU.

A value of this PLT_Mode_flag equal to 0 specifies that the current CU is encoded using a mode other than palette mode. For example, any of a variety of inter-predictive, intra-predictive, or other coding modes may be used. When a value of PLT_Mode_flag is 0, further information may be transmitted to signal which specific mode is used for encoding the respective CU, where such specific mode, typically, may be an HEVC coding mode. The use of the PLT_Mode_flag is described for purposes of example. In other examples, however, other syntax elements such as multi-bit codes may be used to indicate whether the palette-based coding mode is to be used for a CU (or PU in other examples) or to indicate which of a plurality of modes are to be used.

The PLT_Mode_flag or other syntax element may also be transmitted at a higher level. For example, the PLT_Mode_flag may be transmitted at slice level. In this case, a value of the flag equal to 1 implies that all of the CUs in the slice will be encoded using palette mode (which means no mode information, e.g., for palette mode or other modes, needs to be transmitted at CU level). Similarly, this flag can be signaled at the picture parameter set (PPS), sequence parameter set (SPS) or video parameter set (VPS) level. Also, a flag can be sent at one of these levels specifying whether the palette mode is enabled or disabled for the particular picture, slice, etc., while the PLT_Mode_flag indicates whether the palette-based coding mode is used for each CU. In this case, if a flag or other syntax element sent at the slice, PPS, SPS or VPS level indicates that palette coding mode is disabled, in some examples, there may be no need to signal the PLT_Mode_flag for each CU. Alternatively, if a flag or other syntax element sent at the slice, PPS, SPS or VPS level indicates that palette coding mode is enabled, the PLT_Mode_flag may be further signaled to indicate whether the palette-based coding mode is to be used for each CU. Again, as mentioned above, application of these techniques for indicating palette-based coding of a CU could additionally or alternatively be used to indicate palette-based coding of a PU.

A flag, such as PLT_Mode_flag, may also or alternatively be conditionally transmitted or inferred. The conditions for transmitting the PLT_Mode_flag or inferring the flag can be one or more of, as examples, the size of the CU, the frame type, the color space, the color component, the frame size, the frame rate, the layer id in scalable video coding or the view id in multi-view coding.

Techniques for the generation and transmission of a palette will now be discussed. Video encoder 20 may be configured to generate and signal one or more syntax elements and values that may be used by video decoder 30 to construct and/or reconstruct the palette used by video encoder 20 to encode a particular level of the video frame (e.g., a CU). In some examples, video encoder 20 may indicate or otherwise signal a palette for each CU. In other examples, video encoder 20 may indicate or otherwise signal a palette that may be shared among several CUs.

The size of the palette, e.g., in terms of the number of pixel values included, can be a fixed value or can be signaled by video encoder 20 in an encoded video bitstream. Video decoder 30 may receive and decode the indication of the palette size from the encoded video bitstream. The signaling can be separate for different components or a single size can be signaled for all the components. The different components may be, for example, luma and chroma components. The signaling can use unary codes or truncated unary codes (e.g., that truncates at a maximum limit of the palette size). Exponential-Golomb or Rice-Golomb codes can also be used. In some examples, the signaling of the size can be done in the following way: after signaling an entry in the palette, a "stop" flag is signaled. A value of this flag equal to 1 specifies that the current entry is the last one in the palette; a value of this flag equal to 0 specifies that there are more entries in the palette. The "stop" flag may not be transmitted by the encoder if the already constructed palette hits the maximum limit of the palette size. In some examples, the size of the palette can also be conditionally transmitted or inferred based on side information in the same way as described above for "Transmission of flag PLT_Mode_flag."

The palette can be transmitted separately for each color component in the CU. For example, there may be a palette for the Y component of this CU, another palette for the U component of this CU, and yet another palette for the V component of this CU. For the Y palette, the entry may (assumedly) be a representative Y value in this CU. The same applies to the U and V components. It is also possible that the palette may be transmitted for all of the color components in the CU. In this example, the i-th entry in the palette is a triple (Yi, Ui, Vi). In this case, the palette includes values for each of the components.

Prediction of a palette is an alternative approach to the "transmission of palette" described above. In some examples, palette prediction techniques may be used in conjunction with palette signaling techniques. That is, video encoder 20 may be configured to signal syntax elements that may be used by video decoder 30 to predict a portion of the total number of palette entries. In addition, video encoder 20 may be configured to explicitly signal another portion of the palette entries.

In one example of a palette prediction approach, for each CU, one flag "pred_palette_flag" is transmitted. A value of this flag equal to 1 specifies that the palette for the current CU will be predicted from past data and thus there is no need for the palette to be transmitted. A value of this flag equal to 0 means that the palette of the current CU needs to be transmitted. The flag can be separate for different color components (e.g., so that 3 flags need to be transmitted for a CU in YUV video), or a single flag can be signaled for all the color components. For example, a single flag may indicate whether the palettes are transmitted for all of the components or whether the palettes for all of the components will be predicted.

In some examples, the prediction can be performed in the following manner. If the prediction flag value is equal to 1, for the current CU, video encoder 20 copies the palette of one or more of the already encoded neighboring CUs. The palette of the already encoded neighboring CUs may have been transmitted or predicted. For example, the copied neighboring CU can be the left neighboring CU. In the case that the palette of the left CU is not available (as in the case in which the left CU is not encoded using the palette mode or the current CU is at the first column of the picture), the copy of the palette can be from the CU above the current CU. The copied palette can also be a combination of the palettes of a number of neighboring CUs. For example, one or more formulas, functions, rules or the like may be applied to generate a palette based on palettes of one or a combination of a plurality of neighboring CUs.

It is also possible that a candidate list may be constructed and an index is transmitted by video encoder 20 to indicate the candidate CU from which the current CU copies the palette. Video decoder 30 may construct the same candidate list and then use the index to select the palette of the corresponding CU for use with the current CU. For example, the candidate list may include one CU above and one CU on the left, relative to the current CU to be coded within a slice or picture. In this example, a flag or other syntax element may be signaled to indicate the candidate selection. For example, a transmitted flag equal to 0 means the copy is from the left CU, and a transmitted flag equal to 1 means the copy is from the top CU. Video decoder 30 selects the palette to be copied from the corresponding neighbor CU and copies it for use in decoding the current CU. The prediction can also be derived using the most frequent sample values in the causal neighbors of the current CU.

The prediction of palettes can also be entry-wise. For each entry in the palette, video encoder 20 generates and signals a flag. A value of a flag equal to 1 for a given entry specifies that a predicted value (for example, the corresponding entry from a selected candidate CU like the left CU) is used as the value of this entry. A value of a flag equal to 0 specifies that this entry is not predicted and its value will be transmitted to video decoder 30 from video encoder 20, e.g., signaled in a bitstream encoded by video encoder 20 for later decoding by video decoder 30.

The value of "pred_palette_flag," the candidate CU whose palette is used to predict the palette of the current CU or the rules for constructing the candidates can be also conditionally transmitted or inferred based on side information in the same way as described above for "Transmission of flag PLT_Mode_flag."

Next, video encoder 20 may generate and signal a map which indicates what respective palette entry is associated with each pixel in a CU. The i-th entry in the map is corresponding to the i-th position in the CU. A value of the i-th entry equal to 1 specifies that the pixel value at this i-th location in the CU is one of the values in the palette, and a palette index is further transmitted so that video decoder 30 can reconstruct the pixel value (in case there is only one entry in the palette, the transmission of palette index may be skipped). A value of the i-th entry equal to 0 specifies that the pixel value at the i-th position in the CU is not in the palette and thus the pixel value will be transmitted to video decoder 30 explicitly.

If the pixel value at one position in the CU is a value in the palette, it is observed that there is a high probability that the neighboring positions in the CU have the same pixel value. So, after encoding a palette index (say j, which is corresponding to pixel value s) for a position, video encoder 20 may transmit a syntax element "run" to indicate the number of consecutive values of the same pixel value s in the CU before the scan reaches a different pixel value. For example, if the immediate next one has a value different than s, then run=0 is transmitted. If the next one is s but the one after is not s, then run=1.

In the case where a run is not transmitted (e.g., Implicit Run Derivation), the value of the run may be a constant, for example, 4, 8, 16, etc., or the value of the run may also be dependent on side information. For example, the value of the run may depend on block size, e.g., the run is equal to the width of the current block, or the height of the current block, or the half-width (or half-height) of the current block, or a fraction of the width and the height of the block, or a multiple of the height/width of the block. The value of the run may also be dependent on the QP, frame-type, color component, color format (e.g., 444, 422, 420) and/or color space (e.g., YUV, RGB). The value of the run may also depend on the scan direction. In other examples, the value of the run may depend on other types of side information. The value of the run may also be signaled using high level syntax (e.g., PPS, SPS).

In some examples, the map may not need to be transmitted. The run may only start at certain locations. For example, the run may only start at the beginning of each row, or the beginning of every N rows. The starting location may be different for different scan directions. For example, if the vertical scan is used, the run may only start at the beginning of a column or the beginning of every N columns. The start location may depend on side information. For example, the start location may be the mid-point of each row, or each column, or 1/n, 2/n, . . . (n−1)/n (i.e., fractions) of each row/column. The start location may also depend on the QP, frame-type, color component, color format (e.g., 444, 422, 420) and/or color space (e.g., YUV, RGB). In other examples, the start position of the run may depend on other types of side information. The start position can also be signaled using high level syntax (e.g., PPS, SPS, etc.).

It is also possible that the implicit start position derivation and the implicit run derivation are be combined. For example, the run is equal to the distance between two neighboring start positions. In the case that the start point is the beginning (i.e., the first position) of every row, the length of the run is a row.

The scan direction may be vertical or horizontal. It is possible that a flag is transmitted for each CU to indicate the scan direction. Flags may be transmitted separately for each component or a single flag may be transmitted and the indicated scan direction applies to all the color components. It is also possible that other scan directions, like 45 degree or 135 degree, are used. The scan order may be fixed or may be dependent on side information in the same way as described above for "Transmission of flag PLT_Mode_flag".

Above, it is explained how to transmit a palette. An alternative to the above-described examples is to construct the palette on-the-fly. In this case, at the beginning of the CU, there is no entry in the palette, and as video encoder 20 signals new values of the pixels for the positions in the CU, these values are included in the palette. That is, video encoder 20 adds pixel values to the palette as they are generated and transmitted for positions in the CU. Then, later positions in the CU that have the same values may refer to pixel values in the palette, e.g., with index values, instead of having video encoder 20 transmit the pixel values. Similarly, when video decoder 30 receives a new pixel value (e.g., signaled by the encoder) for a position in the CU, it includes the pixel value in the palette constructed by video decoder 30. When later positions in the CU have pixel values that have been added to the palette, video decoder 30 may receive information such as, e.g., index values, that identify the corresponding pixel values in the palette for reconstruction of the pixel values in the CU.

If the maximum palette size is reached, e.g., as the palette is constructed dynamically on-the-fly, then the encoder and decoder share the same mechanism to remove an entry of the palette. One method is to remove the oldest entry in the palette (FIFO queue). Another method is to remove the least used entry in the palette. Another is to weight both methods (time in palette and usage frequency) to decide the entry to be replaced. As one example, if a pixel value entry is removed from the palette, and the pixel value occurs again at a later position in the palette, the encoder may transmit the pixel value instead of including an entry in the palette. Additionally, or alternatively, it is possible that such a pixel value could be re-entered into the palette after having been removed, e.g., as the encoder and decoder scan the positions in the CU.

This disclosure also considers combining an initial palette signaling with the on-the-fly derivation of the palette. In one example, the initial palette would be updated with the coding of the pixels. For example, upon transmitting the initial palette, video encoder 20 may add values to the initial palette or change values in the initial palette as pixel values of additional locations in the CU are scanned. Likewise, upon receiving an initial palette, video decoder 30 may add values to the initial palette or change values in the initial palette as pixel values of additional locations in the CU are scanned. Similarly, the encoder can signal whether the current CU uses transmission of the entire palette, or on-the-fly palette generation, or a combination of transmission of an initial palette with updating of the initial palette by on-the-fly derivation. In some examples, the initial palette may be a full palette at maximum palette size, in which case values in the initial palette may be changed, or a reduced size palette, in which case values are added to the initial palette and, optionally values in the initial palette are changed.

Above, it was described how to transmit the map by identifying the pixel value. Along with that method described above, the transmission of the map can be done by signaling line copying. In one example, line copying is signaled by video encoder 20 such that the pixel value for an entry is equal to the pixel value of the entry of a line above (or in column on the left if the scan is vertical). Then, the 'run' of entries that are copied from the line may be signaled. Also, the line from which it is copied can be indicated; several lines above may be buffered for this purpose. For instance, the previous four rows are stored and which row is copied may be signaled with a truncated unary code or other codes, and then, how many entries of that row are copied, i.e., the run, may be signaled. Hence, in some examples, the pixel value for an entry may be signaled to be equal to a pixel value of an entry in a row immediately above or two or more rows above the current row.

In the case where no run is signaled, the value of the run may be constant/fixed or may be dependent on side information (and derived by the decoder) using the method described above.

It is also possible that the map does not need to be transmitted. For example, the run may start only at certain positions. The start position may be fixed or may be dependent on side information (and derived by the decoder), so the signaling of the start position may be skipped. Instead, one or more the techniques described above may be applied. The implicit start position derivation and the implicit run derivation may also be combined using the same method as described above.

If both methods of map transmission are used, then a flag may indicate whether the pixel is obtained from the palette or from the previous lines, and then an index indicates the entry in the palette or the row, and finally the 'run.'

Figure 2:
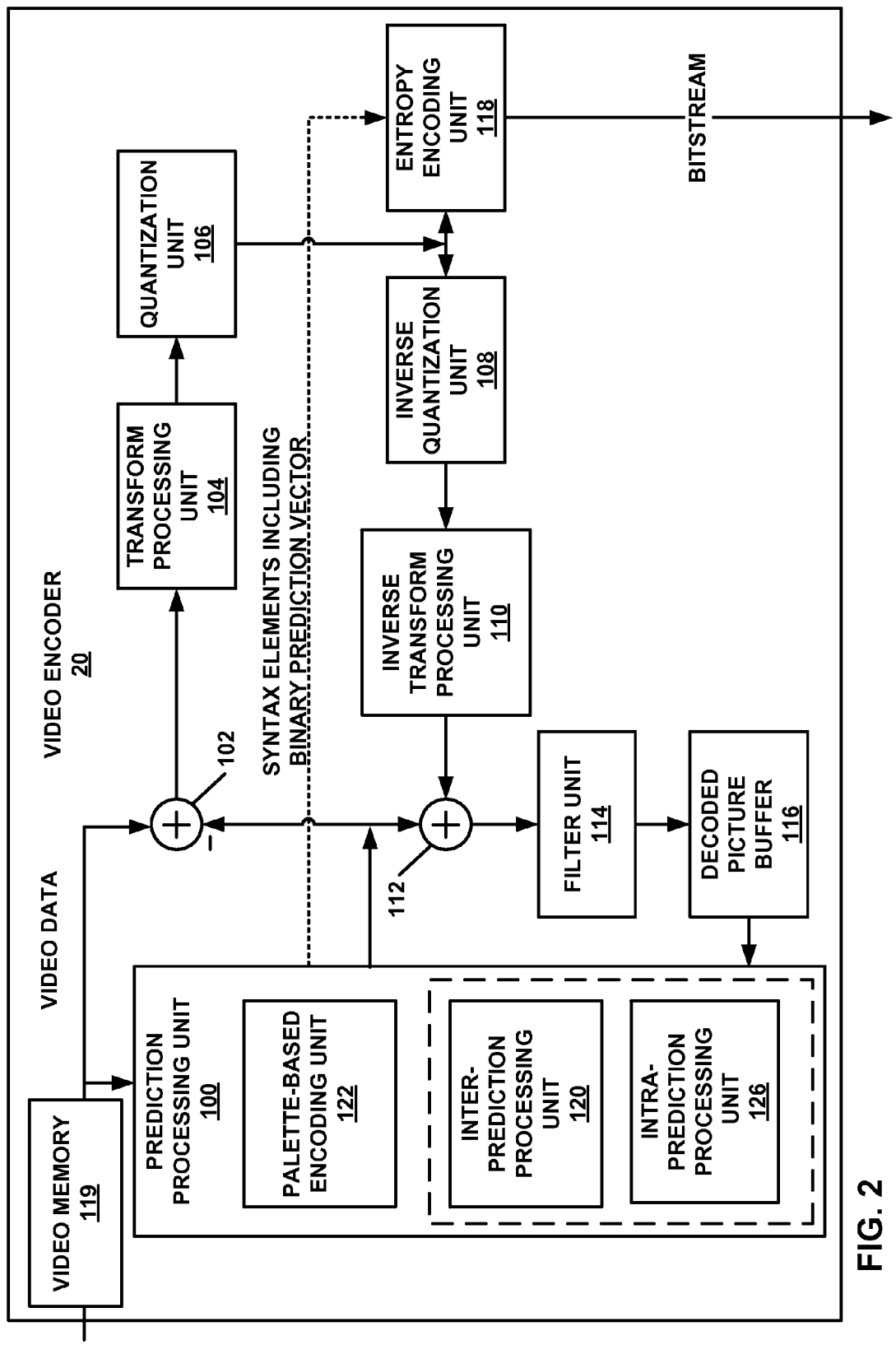
FIG. 2 is a block diagram illustrating an example video encoder that may implement the techniques described in this disclosure.

FIG. 2 is a block diagram illustrating an example video encoder 20 that may implement palette coding techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

Video encoder 20 represents an example of a device that may be configured to perform techniques for palette-based video coding in accordance with various examples described in this disclosure. For example, video encoder 20 may be configured to selectively code various blocks of video data, such as CUs or PUs in HEVC coding, using either palette-based coding or non-palette based coding.

In the example of FIG. 2, video encoder 20 includes prediction processing unit 100, residual generation unit 102, transform processing unit 104, quantization unit 106, inverse quantization unit 108, inverse transform processing unit 110, reconstruction unit 112, filter unit 114, decoded picture buffer (DPB) 116, video memory 119, and entropy encoding unit 118. Prediction processing unit 100 includes inter-prediction processing unit 120 and intra-prediction processing unit 126. Inter-prediction processing unit 120 includes a motion estimation unit and a motion compensation unit (not shown). Video encoder 20 also includes palette-based encoding unit 122 configured to perform various aspects of the palette-based coding techniques described in this disclosure. In other examples, video encoder 20 may include more, fewer, or different functional components.

As will be explained in more detail below with reference to FIGS. 4-9, palette-based encoding unit 122 of video encoder 20 may be configured to generate a palette for a current block of the video data, generate a binary prediction vector for the palette for the current block of video data, the binary prediction vector comprising entries indicating whether or not previously-used palette entries are reused for the palette for the current block of video data, encode the binary prediction vector using a run-length encoding technique, and encode the current block of video data using the palette.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-sub-blocks, and so on.

As shown in FIG. 2, video memory 119 receives video data that is used for encoding a current video block within a video frame. Video memory 119 may store video data to be encoded by the components of video encoder 20 (e.g., configured to store video data). The video data stored in video memory 119 may be obtained, for example, from video source 18 of FIG. 1. DPB 116 is one example of DPB that stores reference video data for use in encoding video data by video encoder 20 (e.g., in intra or inter-coding modes, also referred to as intra- or inter-prediction coding modes). Video memory 119 and DPB 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video memory 119 and DPB 116 may be provided by the same memory device or separate memory devices. In various examples, video memory 119 may be on-chip with other components of video encoder 20, or off-chip relative to those components.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter-prediction on each PU of a CU. The predictive data for the PU may include predictive blocks of the PU and motion information for the PU. Inter-prediction unit 121 may perform different operations for a PU of a CU depending on whether the PU is in an I slice, a P slice, or a B slice. In an I slice, all PUs are intra predicted. Hence, if the PU is in an I slice, inter-prediction unit 121 does not perform inter prediction on the PU. Thus, for blocks encoded in I-mode, the predicted block is formed using spatial prediction from previously-encoded neighboring blocks within the same frame.

If a PU is in a P slice, the motion estimation unit of inter-prediction processing unit 120 may search the reference pictures in a list of reference pictures (e.g., "RefPicList0") for a reference region for the PU. The reference region for the PU may be a region, within a reference picture, that contains sample blocks that most closely corresponds to the sample blocks of the PU. The motion estimation unit may generate a reference index that indicates a position in RefPicList0 of the reference picture containing the reference region for the PU. In addition, the motion estimation unit may generate an MV that indicates a spatial displacement between a coding block of the PU and a reference location associated with the reference region. For instance, the MV may be a two-dimensional vector that provides an offset from the coordinates in the current decoded picture to coordinates in a reference picture. The motion estimation unit may output the reference index and the MV as the motion information of the PU. The motion compensation unit of inter-prediction processing unit 120 may generate the predictive blocks of the PU based on actual or interpolated samples at the reference location indicated by the motion vector of the PU.

If a PU is in a B slice, the motion estimation unit may perform uni-prediction or bi-prediction for the PU. To perform uni-prediction for the PU, the motion estimation unit may search the reference pictures of RefPicList0 or a second reference picture list ("RefPicList1") for a reference region for the PU. The motion estimation unit may output, as the motion information of the PU, a reference index that indicates a position in RefPicList0 or RefPicList1 of the reference picture that contains the reference region, an MV that indicates a spatial displacement between a prediction block of the PU and a reference location associated with the reference region, and one or more prediction direction indicators that indicate whether the reference picture is in RefPicList0 or RefPicList1. The motion compensation unit of inter-prediction processing unit 120 may generate the predictive blocks of the PU based at least in part on actual or interpolated samples at the reference region indicated by the motion vector of the PU.

To perform bi-directional inter prediction for a PU, the motion estimation unit may search the reference pictures in RefPicList0 for a reference region for the PU and may also search the reference pictures in RefPicList1 for another reference region for the PU. The motion estimation unit may generate reference picture indexes that indicate positions in RefPicList0 and RefPicList1 of the reference pictures that contain the reference regions. In addition, the motion estimation unit may generate MVs that indicate spatial displacements between the reference location associated with the reference regions and a sample block of the PU. The motion information of the PU may include the reference indexes and the MVs of the PU. The motion compensation unit may generate the predictive blocks of the PU based at least in part on actual or interpolated samples at the reference regions indicated by the motion vectors of the PU.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding block (e.g., a luma, Cb and Cr coding block) of a CU and the selected predictive blocks (e.g., predictive luma, Cb and Cr blocks) of the PUs of the CU, a residual block (e.g., a luma, Cb and Cr residual block) of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may correspond to a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes corresponding to each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

Figure 3:
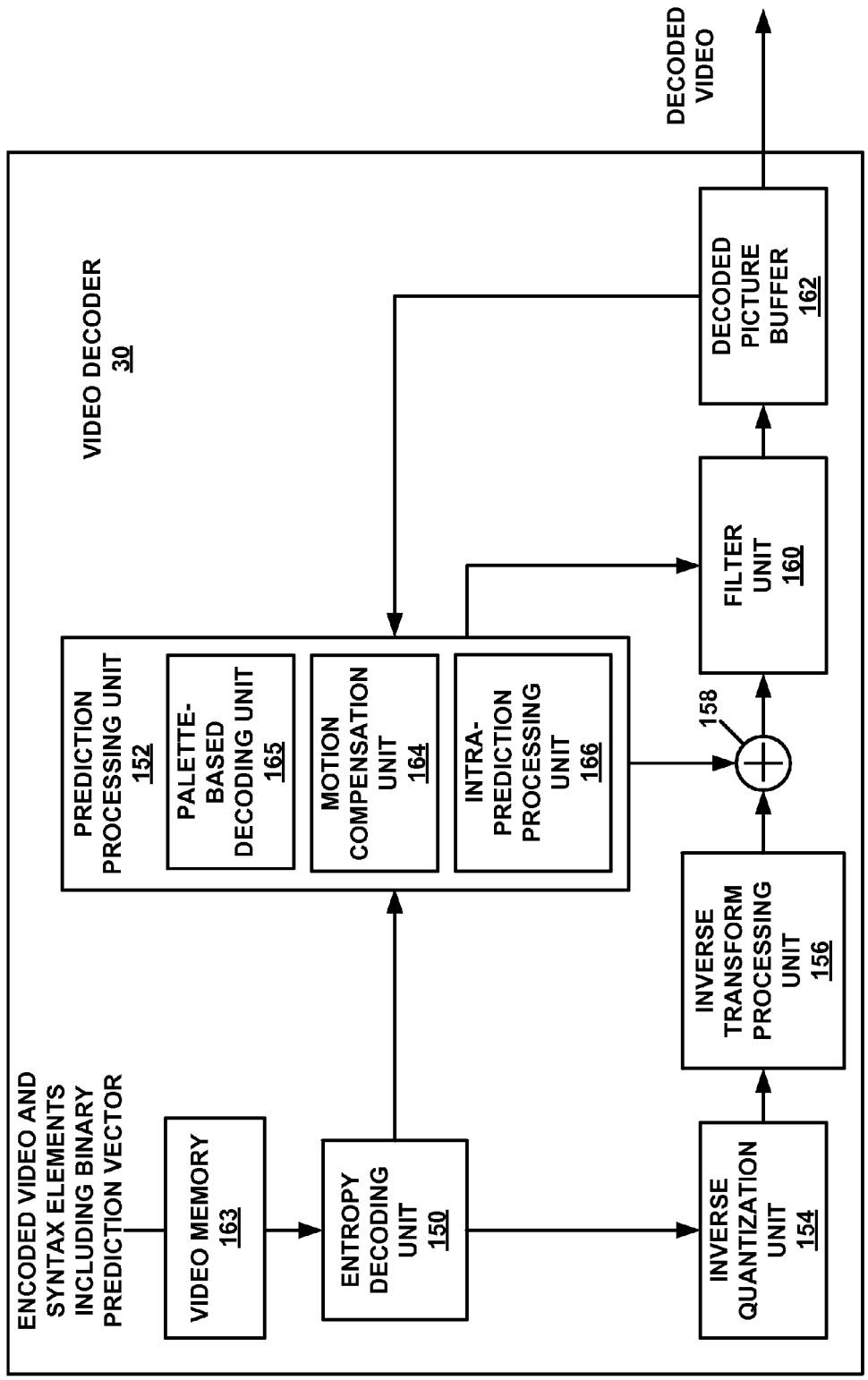
FIG. 3 is a block diagram illustrating an example video decoder that may implement the techniques described in this disclosure.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 3, video decoder 30 includes entropy decoding unit 150, prediction processing unit 152, inverse quantization unit 154, inverse transform processing unit 156, reconstruction unit 158, a filter unit 160, video memory 163, and decoded picture buffer (DPB) 162. Prediction processing unit 152 includes a motion compensation unit 164 and an intra-prediction processing unit 166. Video decoder 30 also includes a palette-based decoding unit 165 configured to perform various aspects of the palette-based coding techniques described in this disclosure. In other examples, video decoder 30 may include more, fewer, or different functional components.

As will be explained in more detail below with reference to FIGS. 4-9, palette-based decoding unit 165 of video decoder 30 may be configured to receive an encoded binary prediction vector (e.g., a binary prediction vector encoded with run-length encoding) for a current block of the video data, decode the encoded binary prediction vector using a run-length decoding technique, generate a palette for the current block of video data based on the binary prediction vector, the binary prediction vector comprising entries indicating whether or not previously-used palette entries are reused for the palette for the current block of video data, and decode the current block of video data using the palette.

A coded picture buffer (CPB), e.g., video memory 163, may receive and store encoded video data (e.g., NAL units) of a bitstream. Entropy decoding unit 150 may receive encoded video data (e.g., NAL units) from the CPB and parse the NAL units to decode syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

As shown in FIG. 3, video memory 163 receives video data that is used for decoding a current video block within a video frame. Video memory 163 may store video data to be decoded by the components of video decoder 30 (e.g., configured to store video data). The video data stored in video memory 163 may be obtained, for example, from an encoded video bitstream produced by video encoder 20. DPB 162 is one example of DPB that stores reference video data for use in decoding video data by video decoder 30 (e.g., in intra or inter-coding modes, also referred to as intra- or inter-prediction coding modes). Video memory 163 and DPB 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video memory 163 and DPB 162 may be provided by the same memory device or separate memory devices. In various examples, video memory 163 may be on-chip with other components of video decoder 30, or off-chip relative to those components.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive blocks (e.g., predictive luma, Cb and Cr blocks) for the PU.

Reconstruction unit 158 may use the transform blocks (e.g., luma, Cb and Cr transform blocks) associated with TUs of a CU and the predictive blocks (e.g., predictive luma, Cb and Cr blocks) of the PUs of the CU, i.e., either intra-prediction data or inter-prediction data, as applicable, to reconstruct the coding blocks (e.g., luma, Cb and Cr coding blocks) of the CU. For example, reconstruction unit 158 may add samples of the transform blocks (e.g., luma, Cb and Cr transform blocks) to corresponding samples of the predictive blocks (e.g., predictive luma, Cb and Cr blocks) to reconstruct the coding blocks (e.g., luma, Cb and Cr coding blocks) of the CU.

Filter unit 160 may perform a deblocking operation to reduce blocking artifacts associated with the coding blocks (e.g., luma, Cb and Cr coding blocks) of the CU. Video decoder 30 may store the coding blocks (e.g., luma, Cb and Cr coding blocks) of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks (e.g., luma, Cb, and Cr blocks) in decoded picture buffer 162, intra prediction or inter prediction operations on PUs of other CUs.

Figure 4:
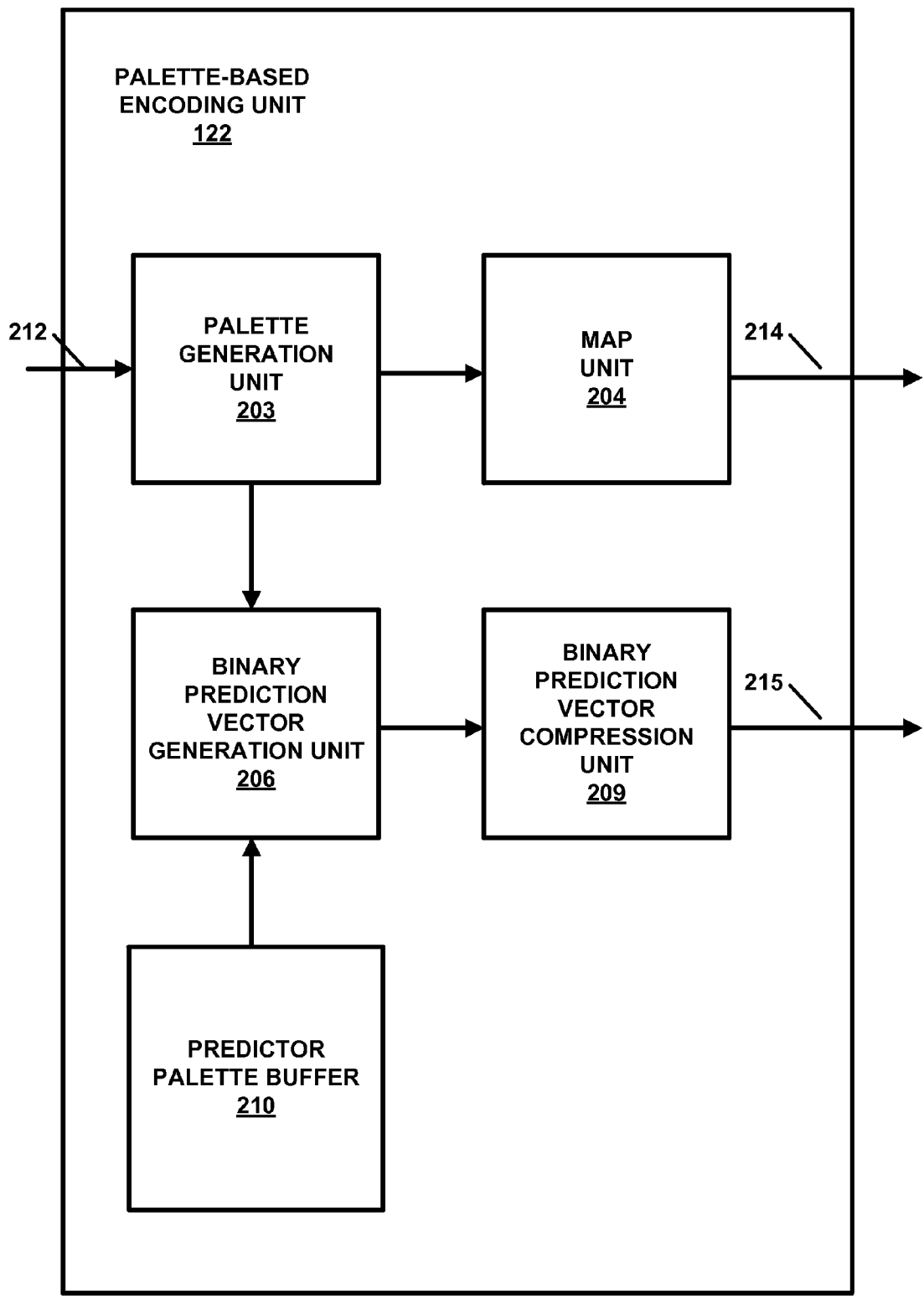
FIG. 4 is a block diagram illustrating an example palette-based encoding unit of the video encoder of FIG. 2.

FIG. 4 is a block diagram showing palette-based encoding unit 122 of video encoder 20 in more detail. Palette-based encoding unit 122 may be configured to perform one or more of the example techniques of this disclosure for encoding a binary prediction vector.

As described above, palette-based encoding unit 122 may be configured to encode a block of video data (e.g., a CU or PU) with a palette-based encoding mode. In a palette-based encoding mode, a palette may include entries numbered by an index and representing color component values (for example, RGB, YUV etc.) or intensities which may be used to indicate pixel values. Palette generation unit 203 may be configured to receive pixel values 212 for a current block of video data and generate a palette of color values for the current block of video data. Palette generation unit 203 may use any techniques for generating a palette for a current block of video data, including the histogram-based techniques discussed above. Palette generation unit 203 may be configured to generate a palette of any size. In one example, palette generation unit 203 may be configured to generate 32 palette entries, where each palette entry includes pixel values for the Y, Cr, and Cb components of a pixel. In the former example, it is assumed that each palette entry specifies the values for all color components of a sample (pixel). However, the concepts described in this document are applicable to using a separate palette for each color component.

Once a palette is generated by palette generation unit 203, map unit 204 may generate a map for the current block of video data that indicates whether or not a particular pixel in the current block of video data may be represented by an entry in the palette generated by palette generation unit 203. Map unit 204 may produce a map 214 that includes syntax elements that indicate how each pixel uses (or does not use) entries from the palette. If the value for a pixel in the current block of video data is not found in the palette, and thus cannot be represented by an index into the palette, map unit 204 may explicitly transmit a pixel value for that particular pixel. In some examples, map unit 204 may predict the explicit pixel value from one of the entries found in the palette. In some other examples, map unit 204 may quantize the pixel and transmit the quantized values.

In addition to signaling syntax elements that indicate the color values used for each of the pixels in a block, palette-based encoding unit 122 may also be configured to signal the palette that is to be used for a current block of video data. In accordance with the techniques of this disclosure, palette-based encoding unit 122 may be configured to employ palette prediction techniques to reduce the amount of data that is signaled to indicate the values of a palette for a particular block of video data.

As one example of palette prediction, as is described in JCTVC-Q0094, which is available as of Jun. 20, 2014 from http://phenix.int-evey.fr/jct/doc_end_user/documents/ 17_Valencia/wg11/JCTVC-Q0094-v1.zip, a palette may include entries that are copied from a predictor palette. A predictor palette may include palette entries from previously-coded blocks that use palette mode or from other reconstructed samples. As shown in FIG. 4, palette-based encoding unit 122 may include a predictor palette buffer 210. Predictor palette buffer 210 may be configured to store a number of previously-used palette entries from previously-encoded blocks. As one example, predictor palette buffer 210 may be configured as a first-in, first-out (FIFO) buffer of a predetermined size. Predictor palette buffer 210 may be of any size. In one example, predictor palette buffer 210 includes up to 64 previously-used palette entries.

In some examples, palette-based encoding unit 122 may be configured to prune the entries in predictor palette buffer 210 such that all palette entries in predictor palette buffer 210 are unique. That is, for each new palette entry to be added to predictor palette buffer 210, palette-based encoding unit 122 may be configured to first check that there are no other identical entries already stored in predictor palette buffer 210. If there are no identical entries, the new palette entry is added to predictor palette buffer 210. If the new entry is a duplicate of an existing entry, the new palette entry is added to predictor palette buffer 210 and the duplicated entries are removed from predictor palette buffer 210.

Palette-based encoding unit 122 may include a binary prediction vector generation unit 206 that is configured to generate and signal a binary flag, for each entry in a palette for a current block of video data generated by palette generation unit 203, to indicate whether a palette entry in predictor palette buffer 210 is copied (or reused) for one of the entries in the palette for the current block of video data (e.g., indicated by flag=1). That is, a flag with a value of 1 in the binary predictor vector indicates that the corresponding entry in predictor palette buffer 210 is reused for the palette for the current block, while a flag with a value of 0 in the binary prediction vector indicates that the corresponding entry in the predictor palette buffer 210 is not reused for the palette for the current block. Additionally, palette-based encoding unit 122 may be configured to explicitly signal some values for the current palette that cannot be copied from entries in the predictor palette buffer 210. The number of new entries may be signaled as well.

In U.S. Provisional Application No. 61/970,257, filed Mar. 25, 2014; U.S. Provisional Application No. 61/981,105, filed Apr. 17, 2014; and U.S. Provisional Application No. 62/002,668, filed May 23, 2014, a binary tree based signaling method and end-position based signaling methods were proposed for coding of the palette binary predictor vector. In U.S. Provisional Application No. 62/002,741, filed May 23, 2014, a group based signaling method was proposed. This disclosure proposes additional techniques for generating, encoding, and decoding the binary prediction vector.

Some examples described herein relate to methods to code the palette prediction vector to improve coding efficiency. For example, assume that the binary prediction vector generated by binary prediction vector generation unit 206 is denoted by:

$$b=[b_0, b_1, \ldots, b_{N-1}], N \geq 0, b_i \{0,1\}, 0 \leq i < N$$

In the equation above, $b_i \{0,1\}$, $0 \leq i < N$ denotes a prediction flag (also called a binary flag or binary prediction flag). If $N=0$, $b=$(i.e., b is the empty vector), which does not need to be signaled. Therefore, in the following description, it may be assumed that $N>0$.

FIG. 5 shows one example of a predictor palette buffer 210 and a current palette 220. As can be seen in FIG. 5, current palette 220 reuses pixel values from predictor palette buffer 210 associated with entry indices 1, 2, 5, and 9. As such, a binary predictor vector produced by binary prediction vector generation unit 206 of FIG. 4 would be b=[110010001000]. As can be seen in this example, the binary prediction vector b includes flags with a value of 1 corresponding to the $1^{st}$, $2^{nd}$, $5^{th}$, and $9^{th}$ indices in the predictor palette buffer 210. That is, the $1^{st}$, $2^{nd}$, $5^{th}$, and $9^{th}$ entries in predictor palette buffer 210 are the only entries reused for current palette 220. For entry indices 5-8 in current palette 220, palette-based encoding unit 122 may be configured to signal palette entry values in the encoded video bitstream (e.g., using explicit signaling or another prediction technique).

In accordance with one or more techniques of this disclosure, video encoder 20 may be configured to encode or generally encode the binary predictor vector b in order to reduce the amount of data needed to signal a palette in the encoded video bitstream. As shown in FIG. 4, binary prediction vector compression unit 209 may be configured to generate and signal encoded binary prediction vector 215. However, it should be understood that the binary prediction vector compression techniques of this disclosure may be implemented in other structures of video encoder 20, including entropy encoding unit 118.

Figure 6:
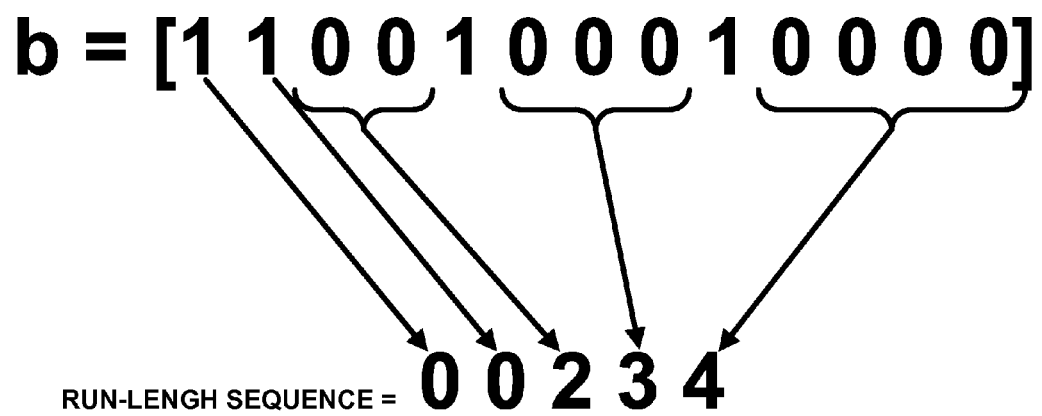
FIG. 6 is a conceptual diagram illustrating an example binary prediction vector encoding technique according to the techniques of the disclosure.

In one example of the disclosure, binary prediction vector compression unit 209 may be configured to encode the binary prediction vector using a run-length based encoding techniques. For example, binary prediction vector compression unit 209 may be configured to encode the binary prediction vector by signaling the number of consecutive '0s' between '1s' in the binary prediction vector using an Exponential-Golomb code. As an example, again assume that b=[110010001000]. In this example, as shown in FIG. 6, the binary prediction vector (i.e., b) can be expressed as: 'zero consecutive 0s'-'1'-'zero consecutive 0s'-'1'-'two consecutive 0s'-'1'-'three consecutive 0s'-'1'- and 'four consecutive 0s'. Because it is known that $b_i \{0,1\}$, except for the last 'consecutive 0' group, each 'consecutive 0' group must be followed by a '1'. Therefore, binary prediction vector compression unit 209 may use zero-based run-length coding techniques to represent the binary prediction vector b as 'zero consecutive 0'-'zero consecutive 0'-'two consecutive 0'-'three consecutive 0'-'four consecutive 0', which can be expressed as the run-length sequence '0-0-2-3-4'.

In accordance with one or more examples of this disclosure related to run-length based signaling, to code the run-length sequence, a Golomb-Rice code, Exponential-Golomb code of any order, Truncated Exponential-Golomb code, Truncated-Rice code or any other binarizations, including truncated binarizations, may be used. In one example, binary prediction vector compression unit 209 uses a 0-th order Exponential-Golomb code as the run-length coding technique.

For the truncated binarization, the maxsymbol can be the maximum possible value of the run depending on the position of '1' in the binary vector and the binary vector size, since, upon moving to the end of the binary vector, the maximum possible run value is reduced from the vector size to 0 depending on the position within the vector. For example, the max symbol can be the binary vector length or the binary vector length minus the position of the '1' from which the run is being counted. In, other words, it is the remaining length measured from the end of the binary vector. For the above example with the binary vector b of a particular size, e.g., 13, the run-length sequence '0-0-2-3-4' can be coded with the truncated binarization '0[13]-0[12]-2[11]-3[8]-4[4]', where the max symbol is provided in the brackets.

Also, in some examples, binarization may be dependent on the position or index of the element (0 or 1) in the binary vector. As a particular example, if the position is smaller than a certain threshold, one type of binarization is used; otherwise, another type of binarization is applied. In some examples, the binarization type can be different binarization codes, or the same code family but with different order, such as Exponential-Golomb code.

In one example, the threshold may be the palette length from the previous block or previous palette coded block. In another example, the threshold can be fixed to some default value or signaled per block, slice, picture or elsewhere. It is to be recognized that a corresponding technique may optionally be used to define a CABAC context to code the run values. Additionally, palette-based encoding unit 122 may be configured to stop run-length signaling when the number of signaled '1' elements (i.e., the number of palette entries from predictor palette buffer 210 indicated as being reused for the current palette 220) reaches a maximum possible number. In some examples, the maximum possible number is the maximum possible palette size.

Some examples of this disclosure relate to end position coding of the run-length sequence indicating the binary prediction vector b. In one or more examples of this disclosure, binary prediction vector compression unit 209 may be configured to encode the binary prediction vector b using a reserved run-length L to code the ending position of the binary prediction vector. In one example, L=1 is used as the reserved run-length. At video encoder 20, if the run-length is equal to or greater than L, binary prediction vector compression unit 209 is configured to add 1 to the run-length. If the actual run-length is less than L, binary prediction vector compression unit 209 is configured to signal the run-length as is. Binary prediction vector compression unit 209 may signal the end position run-length with the reserved run-length L.

Likewise, at video decoder 30, if the decoded value of a run-length is larger than L, 1 is subtracted from the actual run-length. If the decoded value or a run-length is smaller than L, the decoded value is used as the actual run-length. If the decoded value is equal to L, the remaining positions in the binary prediction vector b are all 0. Hence, if the decoded value is equal to L, no more run signaling is necessary.

Using the same example as above (i.e., b=[110010001000]) and assuming that L=1, binary prediction vector compression unit 209 is configured to signal the run-length sequence '0-0-2-3-4' of FIG. 6 as '0-0-3-4-1'. Then, applying the above rules, video decoder 30 may be configured to recover the run-length sequence as '0-0-2-3-end'. That is, the first run-length value of 0 is decoded as 0 and the next run-length sequence of 0 is decoded as 0, as both of the 0 run-length sequences are less than the reserved run-length value of L=1. The next run-length sequence is 3, and as such, video decoder 30 would be configured to subtract 1 from the value of 3 to obtain 2, because the received value of 3 is greater than the reserved run-length value of L=1. Likewise, video decoder 30 would be configured to subtract 1 from the received value of 4 to obtain 3 for next run-length sequence, because the received value of 4 is greater than the reserved run-length value of L=1. Finally, the last received run-length value 1 is equal to the reserved run-length value of L=1. Accordingly, video decoder 30 may determine that no further values of '1' are present in the binary prediction vector.

In another example of the disclosure, binary prediction vector compression unit 209 may be configured to only apply end position coding when the total number of '1s' in the binary prediction vector (i.e., the number of indications of reused palette entries from predictor palette buffer 210) is less than the maximum possible palette size. If the total number of '1s' in the binary prediction vector is equal to a maximum possible palette size, binary prediction vector compression unit 209 may be configured to bypass the signaling of the last run-length.

In the above example, if video decoder 30 determines that the maximum possible palette size is 4, then a run-length sequence of '0-0-2-3' (or run-length sequence 0-0-3-4 in accordance with the reserved run-length rules described above) may be enough to recover the binary prediction vector b. In some examples, the maximum possible palette size may be predetermined. Accordingly, the maximum possible palette size may be determined in advance by video encoder 20 and video decoder 30. In other examples, the maximum possible palette size may be signaled by video encoder 20 in the encoded video bitstream. Signaling the maximum possible palette size may be performed using any suitable conventional data communication techniques or any suitable data communication techniques described herein.

In another example of the disclosure, binary prediction vector compression unit 209 may be configured to apply the end position coding techniques described above only when the last run-length in the run-length sequence is not 0. If the last run-length in the run-length sequence is 0, end position encoding can be bypassed. This statement is the equivalent to when the last flag in binary prediction vector b is equal to 1. In this situation, end position coding can be bypassed. For example, if b=[100000000001], then the run-length sequence is '0-10-0'. The run-length sequence of '0-10' (or signaled value sequence 0-11 in accordance with the reserved run-length rules described above) may be enough to recover the binary prediction vector b. Additionally, the end position may be signaled without signaling any runs to indicate that the binary prediction vector b is a zero vector, meaning no palette entries are predicted.

In some examples, instead of using a fixed value L to signal that the remaining binary flags are 0, a minimum of L and the size of the binary predictor vector may be used to indicate the end position. This is because the value of the run is always less than the size of the binary predictor vector.

Figure 7:
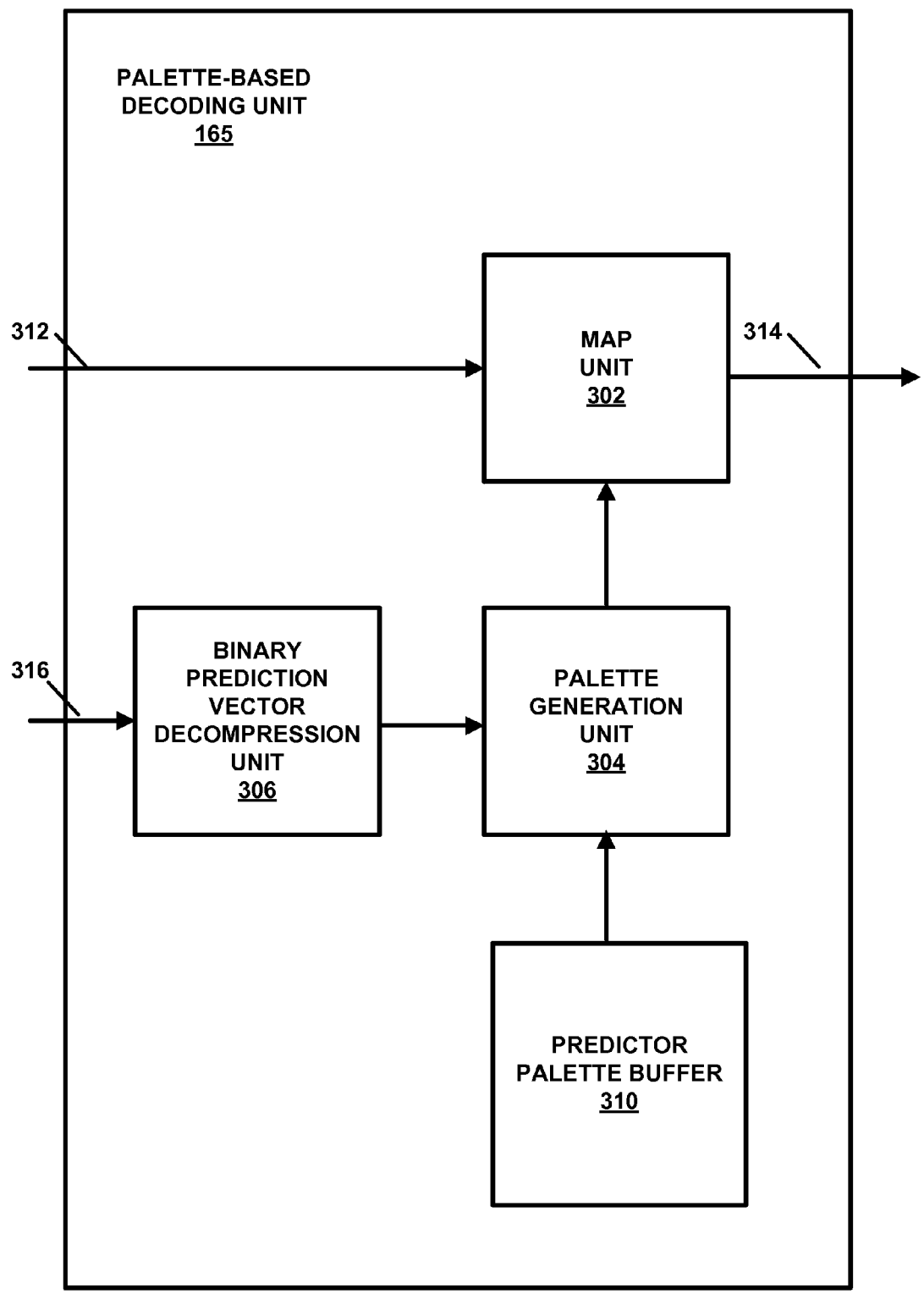
FIG. 7 is a block diagram illustrating an example palette-based decoding unit of the video encoder of FIG. 3.

FIG. 7 is a block diagram showing an example of palette-based decoding unit 165 of video decoder 30. Palette-based decoding unit 165 may be configured to perform in a reciprocal manner to palette-based encoding unit 122 of FIG. 4. Palette-based decoding unit 165 may be configured to receive a map 312 that indicates, for each pixel in a current block, whether or not entries for a palette will be used for the pixels in the current block. In addition, map 312 may further indicate what palette entries are to be used for a given pixel. Map unit 302 may decode the current block of video data using the map 312 and a palette generated by palette generation unit 304 to produce decoded video data 314.

In accordance with the techniques of this disclosure, palette-based decoding unit 165 may also receive an encoded binary prediction vector 316. As discussed above, binary prediction vector 316 may be encoded using a run-length coding technique that encodes a run-length sequence indicating a run of zero values in the binary prediction vector. Binary prediction vector decompression unit 306 may be configured to decode the encoded binary prediction vector using any combination of the run-length coding techniques described above with reference to FIGS. 4-6. Once a binary prediction vector is recovered by binary prediction vector decompression unit 306, palette generation unit 304 may generate a palette for the current block of video data based on the binary prediction vector and previously-used palette entries stored in predictor palette buffer 310. Palette-based decoding unit 165 may be configured to store previously-used palette entries in predictor palette buffer 310 in the same manner that palette-based encoding unit 122 stored previously-used palette entries in predictor palette buffer 210.

Figure 8:
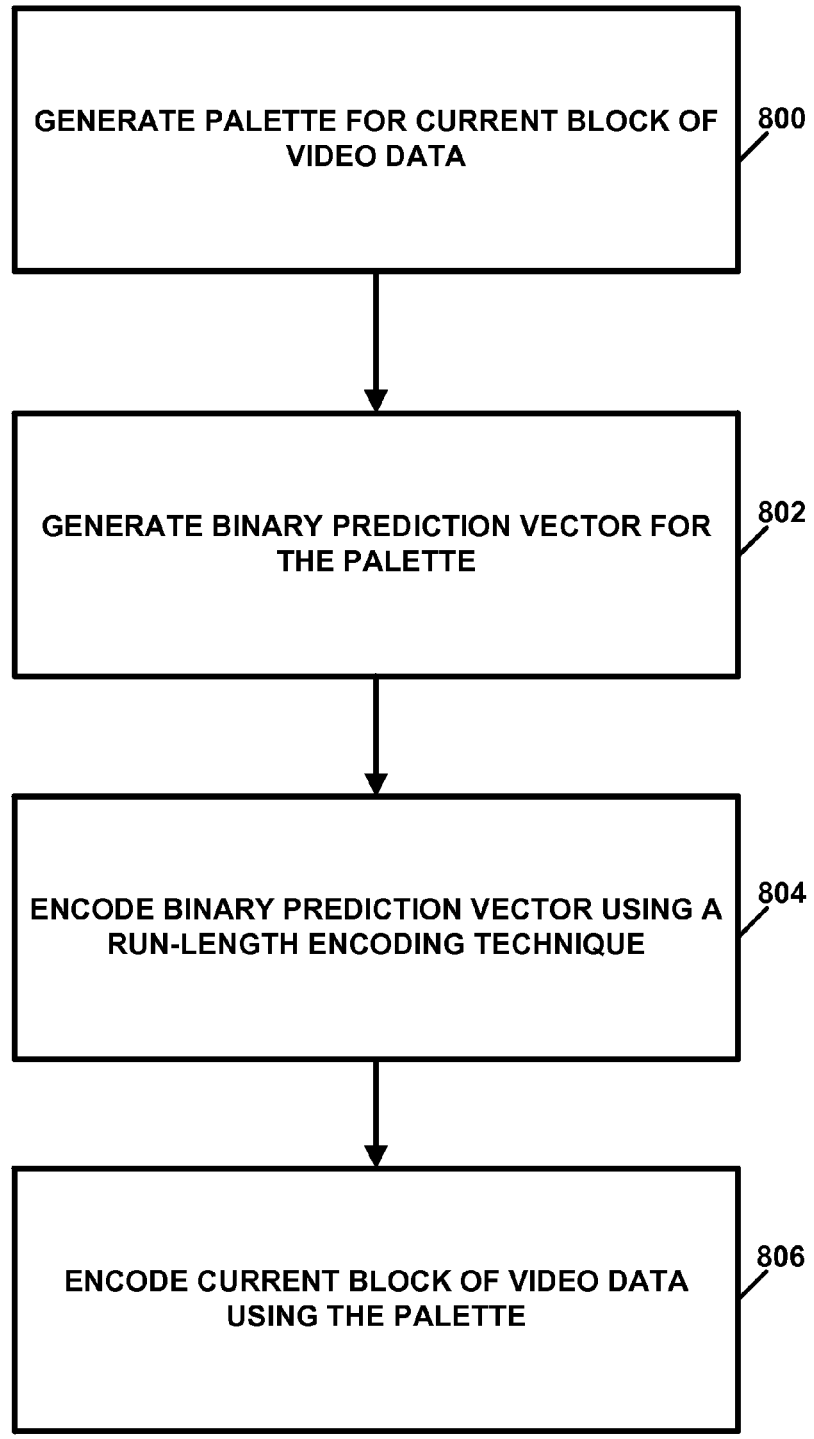
FIG. 8 is a flowchart illustrating an example encoding method of the disclosure.

FIG. 8 is a flowchart illustrating an example encoding method of the disclosure. The techniques of FIG. 8 may be implemented by one or more structural components of video encoder 20, including palette-based encoding unit 122.

In one example of the disclosure, palette-based encoding unit 122 may be configured to generate a palette for the current block of video data (800), and generate a binary prediction vector for the palette for the current block of video data (802). The binary prediction vector comprises entries indicating whether or not previously-used palette entries are reused for the palette for the current block of video data. Palette-based encoding unit 122 may be further configured to encode the binary prediction vector using a run-length encoding technique (804), and encode the current block of video data using the palette (806). In one example, the run-length encoding technique comprises coding a run-length of zeros.

In one example of the disclosure, palette-based encoding unit 122 may be configured to encode the binary prediction vector using an Exponential-Golomb encoding technique. In one example, the Exponential Golomb encoding technique is a $0^{th}$ order Exponential-Golomb encoding technique.

In another example of the disclosure, palette-based encoding unit 122 may be configured to encode the binary prediction vector using the run-length encoding technique and a reserved run-length value L, the reserved run-length value L indicating an end-position of the binary prediction vector. In one example, the reserved run-length value L is 1.

In another example of the disclosure, palette-based encoding unit 122 may be configured to encode the binary prediction vector using the run-length encoding technique, a reserved run-length value L, and a maximum palette size. The reserved run-length value L indicates an end-position of the binary prediction vector. In this example, the reserved run-length value L is not used if a total number of entries in the binary prediction vector that indicate that previously-used palette entries are reused for the palette for the current block of video data is equal to the maximum palette size.

In another example of the disclosure, palette-based encoding unit 122 may be configured to encode the binary prediction vector using the run-length encoding technique, and a reserved run-length value L, the reserved run-length value L indicating an end-position of the binary prediction vector. In this example, the reserved run-length value L is not used if a last run-length in the encoded binary prediction vector does not indicate a run-length of zero.

In another example of the disclosure, palette-based encoding unit 122 may be configured to store previously-used palette entries for one or more previously-encoded blocks of video data in the buffer. Palette-based encoding unit 122 may be further configured to remove duplicate entries of the previously-used palette entries stored in the buffer. In another example of the disclosure, the previously-used palette entries for the one or more previously-encoded blocks of video data comprise previously-used palette entries for a line of pixels above the current block of video data and previously-used palette entries for a line of pixels to the left of the current block of video data.

Figure 9:
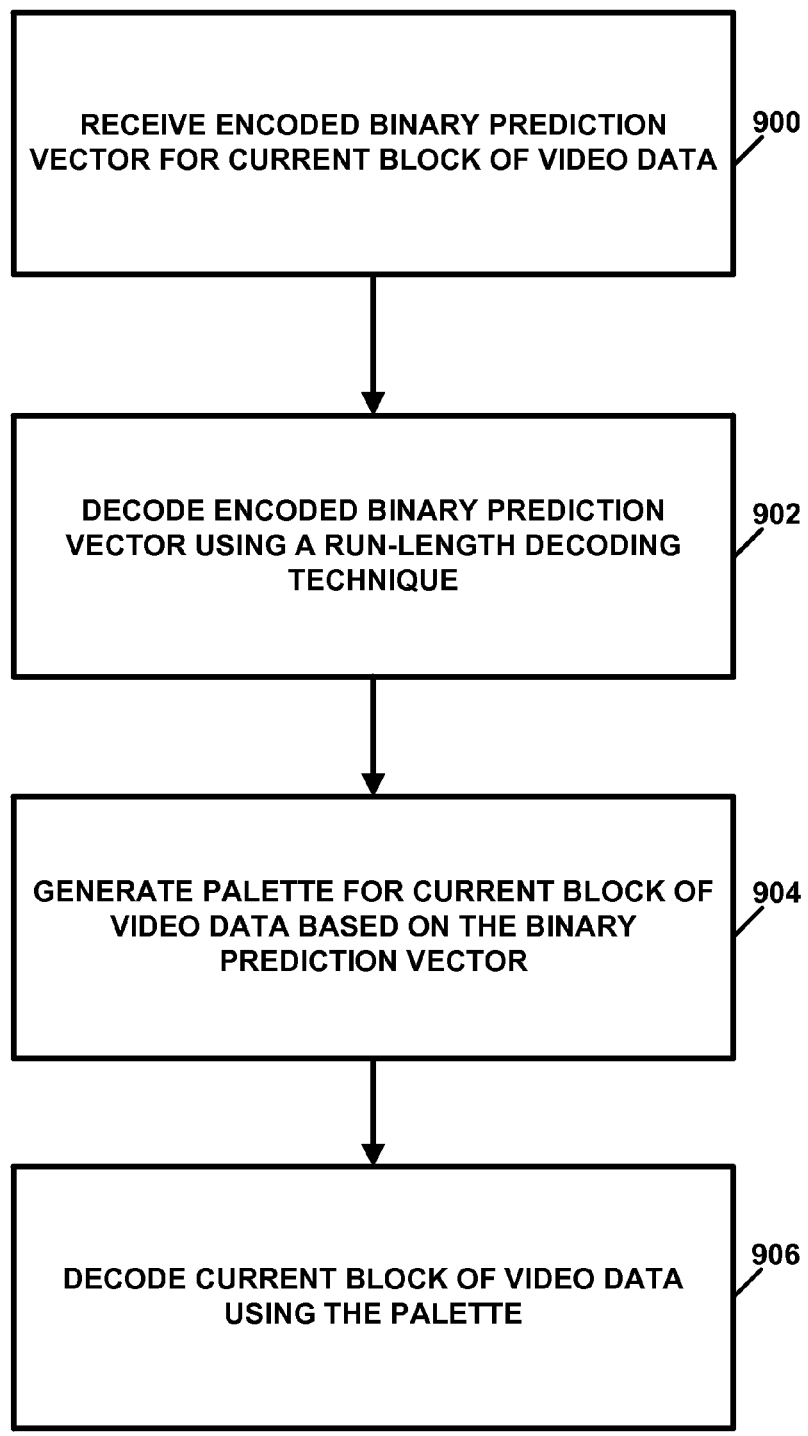
FIG. 9 is a flowchart illustrating an example decoding method of the disclosure.

FIG. 9 is a flowchart illustrating an example decoding method of the disclosure. The techniques of FIG. 9 may be implemented by one or more structural components of video decoder 30, including palette-based decoding unit 165.

In one example of the disclosure, palette-based decoding unit 165 may be configured to receive an encoded binary prediction vector for a current block of video data (900), and decode the encoded binary prediction vector using a run-length decoding technique (902). In one example, the run-length decoding technique comprises coding a run-length of zeros. Palette-based decoding unit 165 may be further configured to generate a palette for the current block of video data based on the binary prediction vector (904). The binary prediction vector comprising entries indicating whether or not previously-used palette entries are reused for the palette for the current block of video data. Palette-based decoding unit 165 may be further configured to decode the current block of video data using the palette (906).

In another example of the disclosure, palette-based decoding unit 165 may be further configured to decode the encoded binary prediction vector using an Exponential-Golomb decoding technique. In one example, the Exponential Golomb decoding technique is a $0^{th}$ order Exponential-Golomb decoding technique.

In another example of the disclosure, palette-based decoding unit 165 may be further configured to decode the encoded binary prediction vector using the run-length decoding technique and a reserved run-length value L, the reserved run-length value L indicating an end-position of the binary prediction vector. In one example, the reserved run-length value L is 1.

In another example of the disclosure, palette-based decoding unit 165 may be further configured to decode the encoded binary prediction vector using the run-length decoding technique, a reserved run-length value L, and a maximum palette size. The reserved run-length value L indicates an end-position of the binary prediction vector. The reserved run-length value L is not used if a total number of entries in the binary prediction vector that indicate that previously-used palette entries are reused for the palette for the current block of video data is equal to the maximum palette size.

In another example of the disclosure, palette-based decoding unit 165 may be further configured to decode the encoded binary prediction vector using the run-length decoding technique, and a reserved run-length value L, the reserved run-length value L indicating an end-position of the binary prediction vector. The reserved run-length value L is not used if a last run-length in the encoded binary prediction vector does not indicate a run-length of zero.

In another example of the disclosure, palette-based decoding unit 165 may be further configured to copy, from a buffer, previously-used palette entries into the palette that are indicated as being reused for the palette by the binary prediction vector, and receive, in the case that the number of previously-used palette entries copied for the palette is less than a maximum palette size, additional palette entries.

In another example of the disclosure, palette-based decoding unit 165 may be further configured to store previously-used palette entries for one or more previously-decoded blocks of video data in the buffer. Palette-based decoding unit 165 may be further configured to remove duplicate entries of the previously-used palette entries stored in the buffer. In one example, the previously-used palette entries for the one or more previously-decoded blocks of video data comprise previously-used palette entries for a line of pixels above the current block of video data and previously-used palette entries for a line of pixels to the left of the current block of video data.

The following sections describe additional example techniques of the disclosure. In a first example, video encoder 20 may be configured to first signal the total number of ones ('num-of-one'), i.e., the number of reused palette entries from predictor palette buffer 210, in binary prediction vector b using a Golomb-Rice code, an Exponential-Golomb code, or a Truncated-Rice code, or their combination. Then, once the number of decoded non-zero binary prediction flags reaches the signaled 'num-of-one', video decoder 30 may determine that the remaining flags in binary prediction vector b are 0 and signaling of these flags was bypassed by video encoder 20. In other words, in this first example, the above-described end position coding procedure can be bypassed. In this case, the actual run-lengths are signaled. In such an example, no upward adjustment to the run-length values is necessary.

In a second example, as described above, only the run-length of zero values in the binary prediction vector is code.

As an alternative technique, the run-length coding can include (e.g., allow) both run lengths of zero values in the binary prediction vector and/or run lengths of one values in the binary prediction vector. The initial run can be pre-defined to be a 'run length of one' (or 'run length of zero'). Then, video encoder 20 may alternate coding of the runs of zeros and runs of ones.

For example, using the same example as above (i.e., b=[110010001000]) and assuming that the first run is 'run length of one', b=[1100100010000] can be expressed as:

'Run=2'–'Run=2'–'Run=1'–'Run=3'–'Run=1'–'Run=4'

However, it is known that 'zero run' must be followed by 'one run' and vice versa; therefore, the above expression can be simplified as:

'Run=2'–'Run=1'–'Run=0'–'Run=2'–'Run=0'–'Run=3' which can be expressed as run-length sequence as '210203'. Golomb-Rice coding, Exponential-Golomb coding, or Truncated-Rice coding can be used to code this sequence. 'Zero run' and 'one run' may have different parameters of a Golomb-Rice code, Exponential-Golomb code, or Truncated-Rice code. Different contexts might be used for 'zero run' and 'one run' if regular bins are used to encode them. The end position coding techniques described elsewhere in this disclosure may also be applied in this example.

Additionally, video encoder 20 may be configured to stop run-length signaling when the number of signaled '1' elements reaches a maximum possible number, which may be the maximum possible palette size.

In a third example, $b_0$, the first element in the binary prediction vector b, may be signaled directly so that video decoder 30 may determine whether the first run is 'zero run' or 'one run' based on the decode $b_0$ value.

In a fourth example, video encoder 20 may be configured to encode the first M flags, i.e., $[b_0, b_1, \ldots, b_{M-1}]$ in the binary prediction vector using a first coding technique and the rest, i.e., $[b_M, b_{M+1}, \ldots, b_{N-1}]$ are coded using a second coding technique. The second coding technique is the run-length based method specified above. In one example, M=4. The first coding technique may be any suitable conventional coding technique. In some examples, the first coding technique may be a non-run length coding based method. In other examples, the first and second coding techniques may both be run-length based coding techniques, but the first coding technique and the second coding technique may be different from each other.

In an example of run-length based signaling for both binary elements, as mentioned above, video encoder 20 may be configured to signal the run-length m for '0' or '1' for the binary prediction vector b. However, the two may be combined where the run-length is signaled for both binary elements. This may be accomplished by the following steps: (1) in the beginning, a bin value is selected, for example, bin=0; (2) signal the run-length for the bin element, (3) if bin is equal to 1, signal the last flag indicating whether the bin equal to 1 is the last '1' element in the binary vector. For example, last equal to 1 indicates that it is the last '1', and equal to 0 otherwise. If last is equal to 1, stop signaling binary vector elements and exit; (4) bin value is swapped, i.e., bin=1−bin and go to step (2) above.

If the first bin value is selected to be 0, then there may be a need to indicate the case when the binary vector is zero. This disclosure may refer to a flag indicating whether the binary vector is zero as zero_flag. For example, a separate flag in the beginning of the run-length signaling may be used. The separate flag may be equal to 1, indicating that the binary vector is zero. In this case, there is no run-length signaling after zero_flag. If zero_flag is 0, then the run-length values are signaled. If the first bin is chosen to be equal to 1, then there may be no need to signal this zero_flag, because the bin equal to 1 has the last_flag indicating the end of signaling.

In an example, the basic algorithm discussed above may be further improved using one or more of the techniques in the following list. Each item in the list may be referred to as an "improved item" in the description below following this list:

1. The bin selection can be fixed to be 0 or 1, or be adaptive (i.e. be different for various blocks). For example, bin can be chosen (i.e., selected) based on the previous blocks by identifying which element is the most frequent or which first element is the most frequent in the previously coded blocks. Alternatively, the bin can be signaled for every block, or can be signaled for group of blocks (e.g., for each tile or in the slice header. Alternatively, the bin can be signaled per picture in a video sequence, for example, in at least one of the picture parameter set (PPS), sequence parameter set (SPS), video parameter set (VPS), or elsewhere.
2. The last flag may not be signaled if the binary vector element '1' for which this last flag is signaled is the last element in the binary vector b.
3. After processing the first element in the binary vector, the signaled run-length value can be the actual run-length value minus 1, because if the element is not the last one, then it is known that it is followed by at least one another binary element.
4. The run-length value for the last '1' element in the binary vector may not be signaled if the run-length value for the last '1' element in the binary vector is preceded by the '0' element, since if the '0' run-length value is stopped before the last element in the binary vector, it is known that this element is '1' and it is the last '1' element in the vector.
5. Alternatively, to the zero_flag signaling, the run-length value for the last '1' element in the binary vector may be included into the first run-length value where specific value is assigned for this. For example, if the first run-length value is zero, the binary vector is zero and there is no other signaling after that. For non-zero binary vector, the first signaled run-length value is needed to be increased by 1 after that specific value, 0 in this example, to avoid ambiguity.
6. The zero_flag and last_flag may be context-adaptive binary arithmetic coding (CABAC) context coded, where, for example, separate context can be assigned for each flag. Contexts can be dependent on the block size, slice type and so on.
7. The run-length values can be coded using various binarization methods, such as unary code, Golomb-Rice code or Exponential-Golomb, or truncated versions of the codes taking into account that the run-length value cannot be greater than the binary vector size.
8. The run-length signaling can be stopped when the number of signaled '1' elements has reached the maximum possible number, which can represent the maximum possible palette size.

For an example with a binary prediction vector b={11001110100001}, the basic algorithm described above produces: [0]0-2(0)-2-3(0)-1-1(0)-4-1(1). In the beginning, the bin is set to 0, and the first run-length is signaled to that bin and it is 0 in this example, then at every '-' the bin is swapped to 1-bin. The signaled last flag is indicated in the braces. In the square braces is the zero-flag. For an example, the following is the result of an improved algorithm: 1-1(0)-1-2(0)-0-0(0)-3.

After the first element processing reflecting the run-length value 1 due to item #5, above, the other run-length values are decremented by 1 as mentioned in the improved item #3, above. The strikethrough indicates no signaling of the last flag for the last '1' in the vector mentioned in #2, above, and no run-length value signaling for the last '1' element suggested in the #4, above.

For another example: b={11001110100011} and an example improved algorithm results in the following: 1-1(0)-1-2(0)-0-0(0)-3-1.

Some example methods may use an Exponential-Golomb code to code the length of copy-above run, copy-left run, or both in palette mode index block coding. For example, a method using an Exponential-Golomb code to code run length may also apply an Exponential-Golomb code to code the length of copy-above run, copy-left run, or both in palette mode index block coding. In another example, after signaling the "greater than 0," "greater than 1," and "greater than 2" flags, a second order Golomb-Rice code may be used to code the remaining values (e.g., run length−3) if the (e.g., run length−3)>=0.

In some examples, the "greater than 0," "greater than 1," and "greater than 2" flags may be used to indicate that a run length is "greater than 0," "greater than 1," or "greater than 2," respectively. A run-length may be coded using a run-length coded binary prediction vector.

According to some additional examples of this disclosure, a video coder (e.g., video encoder 20 or video decoder 30) may determine one or more new palette predictors. According to these additional examples of this disclosure, the video coder may determine a new Boolean vector for signaling palette predictors. These and other techniques are described in greater detail, for example, with respect to FIG. 10 below.

Figure 10:
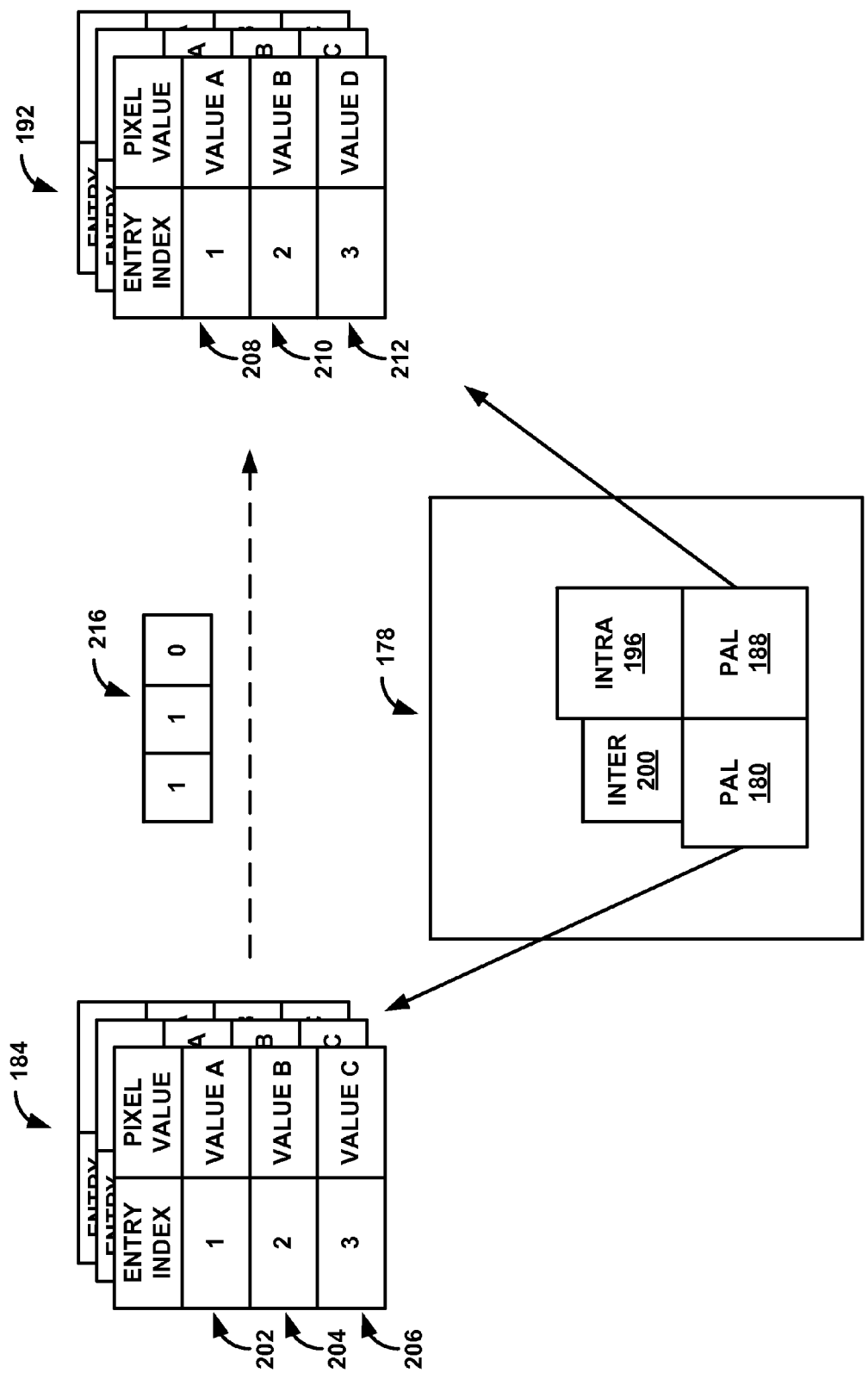
FIG. 10 is a conceptual diagram illustrating an example of determining palette entries for palette-based video coding, consistent with techniques of this disclosure.

FIG. 10 is a conceptual diagram illustrating an example of determining a palette for coding video data, consistent with techniques of this disclosure. The example of FIG. 10 includes a picture 178 having a first coding unit (CU) 180 that is coded using palette mode (PAL) associated with first palettes 184 and a second CU 188 that is associated with second palettes 192. As described in greater detail below and in accordance with the techniques of this disclosure, second palettes 192 are based on first palettes 184. Picture 178 also includes block 196 coded with an intra-prediction coding mode and block 200 that is coded with an inter-prediction coding mode.

The techniques of FIG. 10 are described in the context of performance by video encoder 20 (FIG. 1 and FIG. 2) and video decoder 30 (FIG. 1 and FIG. 3) and with respect to the HEVC video coding standard for purposes of explanation. However, it should be understood that the techniques of this disclosure are not limited in this way, and may be applied by other video coding processors and/or devices in other video coding processes and/or standards.

In general, a palette refers to a number of pixel values that are dominant and/or representative for a CU currently being coded, CU 188 in the example of FIG. 10. First palettes 184 and second palettes 192 are shown as including multiple palettes. In some examples, according to aspects of this disclosure, a video coder (such as video encoder 20 or video decoder 30) may code palettes separately for each color component of a CU. For example, video encoder 20 may encode a palette for a luma (Y) component of a CU, another palette for a chroma (U) component of the CU, and yet another palette for the chroma (V) component of the CU. In this example, entries of the Y palette may represent Y values of pixels of the CU, entries of the U palette may represent U values of pixels of the CU, and entries of the V palette may represent V values of pixels of the CU.

In other examples, video encoder 20 may encode a single palette for all color components of a CU. In this example, video encoder 20 may encode a palette having an i-th entry that is a triple value, including Yi, Ui, and Vi. In this case, the palette includes values for each of the components of the pixels. Accordingly, the representation of palettes 184 and 192 as a set of palettes having multiple individual palettes is merely one example and not intended to be limiting.

In the example of FIG. 10, first palettes 184 includes three entries 202-206 having entry index value 1, entry index value 2, and entry index value 3, respectively. Entries 202-206 relate the index values to pixel values including pixel value A, pixel value B, and pixel value C, respectively. As described herein, rather than coding the actual pixel values of first CU 180, a video coder (such as video encoder 20 or video decoder 30) may use palette-based coding to code the pixels of the block using the indices 1-3. That is, for each pixel position of first CU 180, video encoder 20 may encode an index value for the pixel, where the index value is associated with a pixel value in one or more of first palettes 184. Video decoder 30 may obtain the index values from a bitstream and reconstruct the pixel values using the index values and one or more of first palettes 184. Thus, first palettes 184 are transmitted by video encoder 20 in an encoded video data bitstream for use by video decoder 30 in palette-based decoding.

In some examples, video encoder 20 and video decoder 30 may determine second palettes 192 based on first palettes 184. For example, video encoder 20 and/or video decoder 30 may locate one or more blocks from which the predictive palettes, in this example, first palettes 184, are determined. In some examples, such as the example illustrated in FIG. 10, video encoder 20 and/or video decoder 30 may locate the previously coded CU such as a left neighboring CU (first CU 180) when determining a predictive palette for second CU 188.

In the example of FIG. 10, second palettes 192 include three entries 208-212 having entry index value 1, entry index value 2, and entry index value 3, respectively. Entries 208-212 relate the index values to pixel values including pixel value A, pixel value B, and pixel value D, respectively. In this example, video encoder 20 may code one or more syntax elements indicating which entries of first palettes 184 are included in second palettes 192. In the example of FIG. 10, the one or more syntax elements are illustrated as vector 216 (e.g., a binary prediction vector). Vector 216 has a number of associated bins (or bits), with each bin indicating whether the palette predictor associated with that bin is used to predict an entry of the current palette. For example, vector 216 indicates that the first two entries of first palettes 184 (202 and 204) are included in second palettes 192 (a value of "1" in vector 216), while the third entry of first palettes 184 is not included in second palettes 192 (a value of "0" in vector 216). In the example of FIG. 10, the vector is a Boolean vector.

In some examples, video encoder 20 and video decoder 30 may determine a palette predictor list (which may also be referred to as a palette predictor table) when performing palette prediction. The palette predictor list may include entries from palettes of one or more neighboring blocks that are used to predict one or more entries of a palette for coding a current block. Video encoder 20 and video decoder 30 may construct the list in the same manner. Video encoder 20 and video decoder 30 may code data (such as vector 216) to indicate which entries of the palette predictor list are to be included in a palette for coding a current block.

The document C. Gisquet, G. Laroche, and P. Onno, "AhG10: Palette predictor stuffing," JCTVC-Q0063 discloses one example process for determining a palette predictor list. In some examples, as noted above, video encoder 20 or video decoder 30 may use a Boolean vector (such as vector 216) to indicate whether each item in the palette predictor list is used (or not used) for predicting one or more entries in the palette for the block currently being coded.

In some examples, all of the items in the palette predictor list are derived from the previously coded palette (e.g., the palette coded with the previously coded block). However, such palettes may be spatially far away from the current CU, which may make the palette correlation relatively weak. In general, expanding the palette predictor table (or list) may be helpful (e.g., may provide more accurate predictors, which may result in an efficiency gain). However, determining and using a relatively large palette predictor table (or list) results in a relatively longer Boolean vector.

In various examples, the techniques described in this disclosure may include techniques for various combinations of determining, predicting, and/or signaling palettes in palette-based coding. The techniques may include any combination of determining palette predictors, adding predictors to a candidate list of predictors, pruning predictors from a candidate list of predictors, coding an indication of the usage of candidate predictors, or any other techniques described herein. While certain examples may be individually described for purposes of illustration and clarity, this disclosure contemplates any combination of the techniques for palette-based coding described herein.

According to some aspects of this disclosure, a video coder (such as video encoder 20 or video decoder 30) may determine one or more new palette predictors. For example, certain techniques of this disclosure include determining one or more spatial palette predictors. In an example, if the CU above the current CU (referred to as an "above CU" or "upper CU" and shown as intra-coded CU 196 in the example of FIG. 10) uses palette-based coding, the palette from the upper CU is effective as a palette predictor for the current CU (second CU 188). That is, each of the entries of the upper CU may be included in a palette predictor list (e.g., which may be associated with a vector indicating which entries are used as predictors) for predicting a current palette.

However, if the above CU is part of a different CTU, using the palette from the above CU for prediction may require additional storage. For example, for an inter-predicted block, the video coder may have to access memory (e.g., an external memory to the video coder), to reconstruct pixel values, which may result in latency. However, the video coder may, in some examples, consider the reconstructed samples associated with an intra-predicted block, hereby denoted as reference samples. Such reconstructed samples may be locally stored and available to both video encoder 20 and video decoder 30.

In an example, according to aspects of this disclosure, the reference samples are added to the palette predictor list. For example, the pixel values of a spatially neighboring block (which may be palette coded or intra coded) may be identified as candidate palette predictors and associated with a vector (as noted above). In some examples, only a subset of the reference samples may be used. For example, if the palette predictor list already includes the palette from a particular CU, such as the left neighboring CU (first CU 180), the samples from that CU may not be included in the palette prediction list. Furthermore, in some examples, the video coder may apply a pruning process to remove duplicated palette predictors in the list, at the cost of additional complexity to video encoder 20 and especially video decoder 30. These new palette predictors may be inserted either at the beginning of the predictor list or at the end of the list. In other examples, the new palette predictors (e.g., spatial palette predictors) may be adaptively inserted into the list according to a certain rule such as the predictor list size, CU size, or the like.

In other examples, any other reconstructed pixels such as pixels in any CU in a column to the left of the current CU may also be added to the palette predictor list.

In this manner, video encoder 20 and/or video decoder 30 may determine one or more spatial palette predictors for predicting one or more entries of a palette for a current block of video data, where each entry of the one or more entries indicates a pixel value, and code one or more syntax elements indicating whether each respective palette predictor of the one or more palette predictors are used to predict entries of the palette for the current block of video data.

According to other aspects of this disclosure, a video coder (such as video encoder 20 or video decoder 30) may determine a new Boolean vector for signaling palette predictors. In some examples, the techniques of this disclosure may be used to encode the Boolean vector for palette prediction.

For example, according to aspects of this disclosure, video encoder 20 or video decoder 30 may determine a binary tree for palette prediction. In an example for purposes of illustration, let the 0-1 Boolean vector that represents the usage of palette predictors be denoted by N. To efficiently encode this vector, a binary tree is used. Specifically, vector N is partitioned into several contiguous regions, with each region containing one or more than one vector elements. One bit is signalled to indicate whether all of the elements within that region are zero or not. If the region is not all zero, it is further split into sub regions in the same way.

The partitioning may be stopped according to given rules. For example, one rule may be "if the region size is smaller than a threshold, the partition process stops." When the partitioning stops, if the region size is greater than one, and it contains non-zero elements, each element in the region is signalled in the bitstream. In this case, assuming that the region size is X, if the first X−1 elements are all zero, the last element must be 1, so that it may not be included in the bitstream.

In another example, when the partitioning process stops and the region size is greater than one but less than a second threshold, the video coder may skip the signalling of one bit to indicate whether all of the elements in that region are zero. Instead, for each element in the region, the video coder may signal one bit to indicate whether the respective element is zero or 1.

In another example, instead of a binary tree, a tree with more than two branches at each node may be used. Also, in some examples, the encoding of the first several levels starting from the root of the tree may be bypassed. In such examples, the values may be implicitly assumed to be 1.

According to aspects of this disclosure, the position of the last non-zero entry from the palette predictor list (i.e. the last 1 in the Boolean vector) may be explicitly coded in the bitstream, before signalling whether individual entries are 0 or 1. In this case, the elements from the last position (inclusive) to the end of the Boolean vector are not signalled in the bitstream. In another example, the position of the first palette predictor that is used for prediction, i.e., the first 1 in the Boolean vector, may also be explicitly signalled in the bitstream.

According to aspects of this disclosure, the number of entries that are used from the palette predictor list may be explicitly coded in the bitstream. For example, the techniques of this disclosure include signaling that number of ones ("1s") in the Boolean vector discussed above. In some examples, video encoder 20 may initially signal the number of "1s" (TotalOnes) in a Boolean vector. Video encoder 20 may then sequentially signal (or signal in some other manner) each item in the Boolean vector (0 or 1) until the number of signaled 1s is equal to TotalOnes.

Likewise, video decoder 30 may first decode an indication of the number of ones that are included in a received Boolean vector. Video decoder 30 may then decode each element of the received vector until video decoder 30 has decoded the number of "1s" in the vector matching the number of "1s" indicated. In some examples, the item-wise signaling (e.g., for the elements of the vector) can be sequential from the beginning of the vector. In other examples, the elements of the vector may be signaled according to some other scanning order. In still other examples, the item-wise signaling may use run-length coding technology.

In some examples, when the number of ones in the Boolean vector are initially signaled (e.g., TotalOnes is signaled in the bitstream prior to the Boolean vector), each syntax element (e.g., flag) in the Boolean vector may be context coded using CABAC. In some instances, multiple contexts may be used. In some examples, all of the syntax elements of the Boolean vector may be context coded. In other examples, only a subset of the syntax elements of the Boolean vector may be context coded.

According to aspects of this disclosure, the context for a syntax element of the Boolean vector may be dependent on the position of the syntax element (e.g., a binary flag) within the Boolean vector and the signaled number of ones (TotalOnes) that are initially signaled. In an example for purposes of illustration, if ((position>3) && ((position/2+1)>TotalOnes)) a video coder (such as video encoder 20 or video decoder 30) may use a first context; otherwise (when the condition is not true) the video coder may use another context, where position indicates a relative position of the syntax element being coded in the Boolean vector. In this case, the video coder uses two contexts for coding the syntax elements (e.g., binary flags) in the Boolean vector, and selects a context for a particular syntax element of the Boolean vector based on the relative position of the particular syntax element in the Boolean vector. In another example, the video coder may use one context if a condition ((position>3) && ((position/4+1)>=TotalOnes)) is true and another context if the condition is not true. Other conditions for determining contexts may also be used.

In the examples above, the CABAC context for a particular syntax element of a Boolean vector depends on the relative position of the syntax element and on the total number of ones in the Boolean vector (TotalOnes). In other examples, instead of dependence on position and TotalOnes, the video coder may determine context for syntax elements based on a relative position of the syntax element being coded and the total number of ones that have been signaled so far (e.g., the total number of ones that have occurred prior to the syntax element being coded in the Boolean vector). In still other examples, a video coder may use any combination of the above-described conditions to determine context for CABAC coding syntax elements of a Boolean vector.

According to aspects of this disclosure, a palette size is signaled by an encoder and received by a decoder. For example, a number of entries in a palette may be signaled to indicate the size of the palette. In some examples, video encoder 20 may initially signal the palette size (PLTSize). Video encoder 20 may then signal each item in the Boolean vector (0 or 1) until the number of signaled 1s is equal to PLTSize. Video decoder 30 may receive an indication of the palette size, and may continue to add to the palette (e.g., using palette predictors identified by a vector) until the number of entries in the palette reaches the signaled palette size.

In some examples, video encoder 20 may initially signal a palette size (PLTSize). Video encoder 20 may then signal the number of unpredicted palette items (nonPredPLTSize). Video encoder 20 may then signal each item in the Boolean vector (0 or 1) until the number of signaled "1s" is equal to a difference between the palette size and the number of unpredicted palette items (PLTSize−nonPredPLTSize). In some examples, video decoder 30 may receive an indication of the palette size and the number of entries in the palette that are not predicted using a palette predictor (e.g., the number of "0s" of a vector). Video decoder 30 may also receive a vector indicating which palette predictors are to be included in a palette (e.g., such as the Boolean vector described above). Video decoder 30 may then decode each item in the vector until the number of "1s" is equal to a difference between the palette size and the number of unpredicted palette items (PLTSize−nonPredPLTSize).

In this manner, video encoder 20 and/or video decoder 30 may, in one example, determine one or more palette predictors for predicting one or more entries of a palette for a current block of video data, wherein each entry of the one or more entries indicates a pixel value, determine a vector having a plurality of bins, wherein each bin of the vector indicates whether a respective palette predictor of the one or more palette predictors is used to predict an entry of the palette for the current block of video data, partition the vector into one or more regions, and determine one or more values of the bins of the vector based on the partitioning.

While the techniques of FIG. 10 are described above are described in the context of CUs (HEVC), it should be understood that the techniques may also be applied to prediction units (PUs) or in other video coding processes and/or standards.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

Certain aspects of this disclosure have been described with respect to the developing HEVC standard for purposes of illustration. However, the techniques described in this disclosure may be useful for other video coding processes, including other standard or proprietary video coding processes not yet developed.

The techniques described above may be performed by video encoder 20 (FIGS. 1 and 2) and/or video decoder 30 (FIGS. 1 and 3), both of which may be generally referred to as a video coder. Likewise, video coding may refer to video encoding or video decoding, as applicable.

The techniques described in this disclosure may include techniques for various combinations of one or more different aspects of palette coding.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims. The above methods can be used individually or in combination.

What is claimed is:

1. A method of decoding video data, the method comprising:
   receiving an encoded binary prediction vector for a current block of video data;
   decoding the encoded binary prediction vector using a run-length decoding technique and a reserved run-length value L, the reserved run-length value L indicating an end-position of the binary prediction vector;
   generating a palette for the current block of video data based on the binary prediction vector, the binary prediction vector comprising entries indicating whether or not previously-used palette entries are reused for the palette for the current block of video data; and
   decoding the current block of video data using the palette.

2. The method of claim 1, wherein decoding the encoded binary prediction vector comprises decoding the encoded binary prediction vector using an Exponential-Golomb decoding technique on a run-length sequence produced by the run-length decoding technique.

3. The method of claim 2, wherein the Exponential Golomb decoding technique is a $0^{th}$ order Exponential-Golomb decoding technique.

4. The method of claim 1, wherein the reserved run-length value L is 1.

5. The method of claim 1, wherein decoding the encoded binary prediction vector comprises:
   decoding the encoded binary prediction vector using the run-length decoding technique, the reserved run-length value L, and a maximum palette size, wherein the reserved run-length value L is not used if a total number of entries in the binary prediction vector that indicate that previously-used palette entries are reused for the palette for the current block of video data is equal to the maximum palette size.

6. The method of claim 1, wherein decoding the encoded binary prediction vector comprises:
   decoding the encoded binary prediction vector using the run-length decoding technique, and the reserved run-length value L, wherein the reserved run-length value L is not used if a last run-length in the encoded binary prediction vector does not indicate a run-length of zero.

7. The method of claim 1, wherein generating the palette for the current block of video data based on the binary prediction vector comprises:
   copying, from a buffer, previously-used palette entries into the palette that are indicated as being reused for the palette by the binary prediction vector; and
   receiving, in the case that the number of previously-used palette entries copied for the palette is less than a maximum palette size, additional palette entries.

8. The method of claim 7, further comprising:
  storing the previously-used palette entries for one or more previously-decoded blocks of video data in the buffer.

9. The method of claim 8, further comprising:
  removing duplicate entries of the previously-used palette entries stored in the buffer.

10. The method of claim 8, wherein the previously-used palette entries for the one or more previously-decoded blocks of video data comprise previously-used palette entries for a line of pixels above the current block of video data and previously-used palette entries for a line of pixels to the left of the current block of video data.

11. The method of claim 1, wherein the run-length decoding technique comprises coding a run-length of zeros.

12. A method of encoding video data, the method comprising:
  generating a palette for the current block of video data;
  generating a binary prediction vector for the palette for the current block of video data, the binary prediction vector comprising entries indicating whether or not previously-used palette entries are reused for the palette for the current block of video data;
  encoding the binary prediction vector using a run-length encoding technique and a reserved run-length value L, the reserved run-length value L indicating an end-position of the binary prediction vector; and
  encoding the current block of video data using the palette.

13. The method of claim 12, wherein encoding the binary prediction vector comprises encoding the binary prediction vector using an Exponential-Golomb encoding technique on a run-length sequence produced by the run-length encoding technique.

14. The method of claim 13, wherein the Exponential Golomb encoding technique is a $0^{th}$ order Exponential-Golomb encoding technique.

15. The method of claim 12, where in the reserved run-length value L is 1.

16. The method of claim 12, wherein encoding the binary prediction vector comprises:
  encoding the binary prediction vector using the run-length encoding technique, the reserved run-length value L, and a maximum palette size, wherein the reserved run-length value L is not used if a total number of entries in the binary prediction vector that indicate that previously-used palette entries are reused for the palette for the current block of video data is equal to the maximum palette size.

17. The method of claim 12, wherein encoding the binary prediction vector comprises:
  encoding the binary prediction vector using the run-length encoding technique, and the reserved run-length value L wherein the reserved run-length value L is not used if a last run-length in the encoded binary prediction vector does not indicate a run-length of zero.

18. The method of claim 12, further comprising:
  storing the previously-used palette entries for one or more previously-encoded blocks of video data in a buffer.

19. The method of claim 18, further comprising:
  removing duplicate entries of the previously-used palette entries stored in the buffer.

20. The method of claim 18, wherein the previously-used palette entries for the one or more previously-encoded blocks of video data comprise previously-used palette entries for a line of pixels above the current block of video data and previously-used palette entries for a line of pixels to the left of the current block of video data.

21. The method of claim 12, wherein the run-length encoding technique comprises coding a run-length of zeros.

22. An apparatus configured to decode video data, the apparatus comprising:
  a memory configured to store the video data; and
  a video decoder in communication with the memory, the video decoder configured to:
    receive an encoded binary prediction vector for a current block of the video data;
    decode the encoded binary prediction vector using a run-length decoding technique and a reserved run-length value L, the reserved run-length value L indicating an end-position of the binary prediction vector;
    generate a palette for the current block of video data based on the binary prediction vector, the binary prediction vector comprising entries indicating whether or not previously-used palette entries are reused for the palette for the current block of video data; and
    decode the current block of video data using the palette.

23. The apparatus of claim 22, wherein to decode the encoded binary prediction vector, the video decoder is further configured to:
  decode the encoded binary prediction vector using an Exponential-Golomb decoding technique on a run-length sequence produced by the run-length decoding technique.

24. The apparatus of claim 23, wherein the Exponential Golomb decoding technique is a $0^{th}$ order Exponential-Golomb decoding technique.

25. The apparatus of claim 22, where in the reserved run-length value L is 1.

26. The apparatus of claim 22, wherein to decode the encoded binary prediction vector, the video decoder is further configured to:
  decode the encoded binary prediction vector using the run-length decoding technique, the reserved run-length value L, and a maximum palette size, wherein the reserved run-length value L is not used if a total number of entries in the binary prediction vector that indicate that previously-used palette entries are reused for the palette for the current block of video data is equal to the maximum palette size.

27. The apparatus of claim 22, wherein to decode the encoded binary prediction vector, the video decoder is further configured to:
  decode the encoded binary prediction vector using the run-length decoding technique, and the reserved run-length value L, wherein the reserved run-length value L is not used if a last run-length in the encoded binary prediction vector does not indicate a run-length of zero.

28. The apparatus of claim 22, wherein to generate the palette for the current block of video data based on the binary prediction vector, the video decoder is further configured to:
  copy, from a buffer, previously-used palette entries into the palette that are indicated as being reused for the palette by the binary prediction vector; and
  receive, in the case that the number of previously-used palette entries copied for the palette is less than a maximum palette size, additional palette entries.

29. The apparatus of claim 28, wherein the video decoder is further configured to:
  store the previously-used palette entries for one or more previously-decoded blocks of video data in the buffer.

30. The apparatus of claim 29, wherein the video decoder is further configured to:
remove duplicate entries of the previously-used palette entries stored in the buffer.

31. The apparatus of claim 29, wherein the previously-used palette entries for the one or more previously-decoded blocks of video data comprise previously-used palette entries for a line of pixels above the current block of video data and previously-used palette entries for a line of pixels to the left of the current block of video data.

32. The apparatus of claim 22, wherein the run-length decoding technique comprises coding a run-length of zeros.

33. The apparatus of claim 22, further comprising:
a display configured to display a picture including the decoded current block of the video data.

34. An apparatus configured to encode video data, the apparatus comprising:
a memory configured to store the video data; and
a video encoder in communication with the memory, the video encoder configured to:
generate a palette for a current block of the video data;
generate a binary prediction vector for the palette for the current block of video data, the binary prediction vector comprising entries indicating whether or not previously-used palette entries are reused for the palette for the current block of video data;
encode the binary prediction vector using a run-length encoding technique and a reserved run-length value L, the reserved run-length value L indicating an end-position of the binary prediction vector; and
encode the current block of video data using the palette.

35. The apparatus of claim 34, wherein to encode the binary prediction vector, the video encoder is further configured to:
encode the binary prediction vector using an Exponential-Golomb encoding technique on a run-length sequence produced by the run-length encoding technique.

36. The apparatus of claim 35, wherein the Exponential Golomb encoding technique is a $0^{th}$ order Exponential-Golomb encoding technique.

37. The apparatus of claim 34, where in the reserved run-length value L is 1.

38. The apparatus of claim 34, wherein to encode the binary prediction vector, the video encoder is further configured to:
encode the binary prediction vector using the run-length encoding technique, the reserved run-length value L, and a maximum palette size, wherein the reserved run-length value L is not used if a total number of entries in the binary prediction vector that indicate that previously-used palette entries are reused for the palette for the current block of video data is equal to the maximum palette size.

39. The apparatus of claim 34, wherein to encode the binary prediction vector, the video encoder is further configured to:
encode the binary prediction vector using the run-length encoding technique, and the reserved run-length value L, wherein the reserved run-length value L is not used if a last run-length in the encoded binary prediction vector does not indicate a run-length of zero.

40. The apparatus of claim 34, wherein the video encoder is further configured to:
store the previously-used palette entries for one or more previously-encoded blocks of video data in a buffer.

41. The apparatus of claim 40, wherein the video encoder is further configured to:
remove duplicate entries of the previously-used palette entries stored in the buffer.

42. The apparatus of claim 40, wherein the previously-used palette entries for the one or more previously-encoded blocks of video data comprise previously-used palette entries for a line of pixels above the current block of video data and previously-used palette entries for a line of pixels to the left of the current block of video data.

43. The apparatus of claim 34, wherein the run-length encoding technique comprises coding a run-length of zeros.

44. The apparatus of claim 34, further comprising:
a camera configured to capture the video data.

45. An apparatus configured to decode video data, the apparatus comprising:
means for receiving an encoded binary prediction vector for a current block of video data;
means for decoding the encoded binary prediction vector using a run-length decoding technique and a reserved run-length value L, the reserved run-length value L indicating an end-position of the binary prediction vector;
means for generating a palette for the current block of video data based on the binary prediction vector, the binary prediction vector comprising entries indicating whether or not previously-used palette entries are reused for the palette for the current block of video data; and
means for decoding the current block of video data using the palette.

46. An apparatus configured to encode video data, the apparatus comprising:
means for generating a palette for the current block of video data;
means for generating a binary prediction vector for the palette for the current block of video data, the binary prediction vector comprising entries indicating whether or not previously-used palette entries are reused for the palette for the current block of video data;
means for encoding the binary prediction vector using a run-length encoding technique and a reserved run-length value L, the reserved run-length value L indicating an end-position of the binary prediction vector; and
means for encoding the current block of video data using the palette.

47. A non-transitory computer-readable storage medium storing instructions that, when executed, cause one or more processors of a device configured to decode video data to:
receive an encoded binary prediction vector for a current block of the video data;
decode the encoded binary prediction vector using a run-length decoding technique and a reserved run-length value L, the reserved run-length value L indicating an end-position of the binary prediction vector;
generate a palette for the current block of video data based on the binary prediction vector, the binary prediction vector comprising entries indicating whether or not previously-used palette entries are reused for the palette for the current block of video data; and
decode the current block of video data using the palette.

48. A non-transitory computer-readable storage medium storing instructions that, when executed, cause one or more processors of a device configured to encode video data to:
generate a palette for a current block of the video data;
generate a binary prediction vector for the palette for the current block of video data, the binary prediction vector comprising entries indicating whether or not previously-used palette entries are reused for the palette for the current block of video data;

encode the binary prediction vector using a run-length encoding technique and a reserved run-length value L, the reserved run-length value L indicating an end-position of the binary prediction vector; and encode the current block of video data using the palette.

\* \* \* \* \*